US009532252B2

(12) United States Patent
Hariharan et al.

(10) Patent No.: US 9,532,252 B2
(45) Date of Patent: Dec. 27, 2016

(54) DIAGNOSIS OF CELLULAR NETWORK ELEMENT STATES USING RADIO FREQUENCY MEASUREMENTS

(71) Applicant: AT&T Intellectual Property I, L.P., Atlanta, GA (US)

(72) Inventors: Srikanth Hariharan, San Ramon, CA (US); Ernest Tsui, Pleasanton, CA (US); Christopher M. Riley, Westminster, MD (US); Bo Ji, Columbus, OH (US); Xiaojun Tang, San Ramon, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 181 days.

(21) Appl. No.: 13/693,271

(22) Filed: Dec. 4, 2012

(65) Prior Publication Data
US 2014/0153418 A1 Jun. 5, 2014

(51) Int. Cl.
*H04L 12/26* (2006.01)
*H04W 24/10* (2009.01)
*H04W 24/08* (2009.01)

(52) U.S. Cl.
CPC ............ *H04W 24/10* (2013.01); *H04W 24/08* (2013.01)

(58) Field of Classification Search
CPC .. H04W 24/10; H04B 17/0045; H04B 17/005; H04L 5/006
USPC ............................... 455/423, 67.11, 438, 424
See application file for complete search history.

(56) References Cited

U.S. PATENT DOCUMENTS

| | | | | |
|---|---|---|---|---|
| 5,396,645 | A * | 3/1995 | Huff | 455/441 |
| 6,266,528 | B1 * | 7/2001 | Farzaneh | 455/423 |
| 6,973,059 | B1 * | 12/2005 | Borst et al. | 370/330 |
| 7,206,600 | B2 * | 4/2007 | Reece et al. | 455/550.1 |
| 7,406,337 | B2 * | 7/2008 | Kim et al. | 455/562.1 |
| 7,983,187 | B2 * | 7/2011 | Wigren | 370/252 |
| 8,369,486 | B1 | 2/2013 | Som De Curff | |
| 8,526,391 | B2 * | 9/2013 | Issakov et al. | 370/330 |
| 2008/0248743 | A1 * | 10/2008 | Krinsky | H04H 20/26 455/3.06 |
| 2010/0120415 | A1 * | 5/2010 | Urquhart et al. | 455/424 |
| 2010/0144363 | A1 * | 6/2010 | De Rosa | H04W 52/0206 455/452.1 |
| 2010/0254344 | A1 * | 10/2010 | Wei | H04W 16/10 370/330 |

(Continued)

FOREIGN PATENT DOCUMENTS

| | | |
|---|---|---|
| EP | 1795018 A2 | 6/2007 |
| EP | 1198963 B1 | 6/2008 |
| EP | 2215746 A1 | 8/2010 |

*Primary Examiner* — Shaq Taha
(74) *Attorney, Agent, or Firm* — Amin, Turocy & Watson, LLP

(57) ABSTRACT

Techniques for monitoring and diagnosing states of wireless network elements having a known impact on uplink interference are presented. In an aspect, a method includes receiving, by a system including a processor, diagnostic data for a cellular network including strength data representative of strengths of radio frequency signals, prior to demodulation, respectively received at a plurality of antennas of a base station of the cellular network over a defined duration of time and at a defined sampling rate. The method further includes, based on analyzing the strength data by the system, determining by the system, a state of a network element of the cellular network.

20 Claims, 16 Drawing Sheets

(56) References Cited

U.S. PATENT DOCUMENTS

| | | | |
|---|---|---|---|
| 2012/0207032 A1* | 8/2012 | Chen | H04L 1/24 |
| | | | 370/252 |
| 2012/0252388 A1* | 10/2012 | Kim | H04H 20/22 |
| | | | 455/192.2 |
| 2012/0257585 A1* | 10/2012 | Sydor et al. | 370/329 |
| 2012/0289242 A1 | 11/2012 | McCarthy et al. | |
| 2012/0314665 A1* | 12/2012 | Ishida | H01Q 21/28 |
| | | | 370/329 |
| 2013/0017850 A1* | 1/2013 | Abdelmonem | H04B 1/1036 |
| | | | 455/501 |
| 2013/0194984 A1* | 8/2013 | Cheng et al. | 370/294 |
| 2013/0210368 A1* | 8/2013 | Lee | H04B 17/318 |
| | | | 455/67.11 |
| 2013/0310023 A1* | 11/2013 | Bevan et al. | 455/423 |
| 2014/0045501 A1* | 2/2014 | Cheung | H04W 36/18 |
| | | | 455/437 |

* cited by examiner

| Category | Columns |
|---|---|
| Information 302 | Cell name |
| | Local ID |
| | RNC |
| | Market |
| | Cell repaired? |
| | Date(s) of repair |
| | Analysis dates |
| Config. Parameters 304 | Beamwidth |
| | AntFeederCable_ulAttenuation_A |
| | AntFeederCable_ulAttenuation_B |
| | ExternalTma_ulGain |
| | ExternalTma_dlAttenuation |
| | AntFeederCable_dlAttenuation_A |
| | AntFeederCable_dlAttenuation_B |
| | primaryCpichPower |
| Overall scores 306 | Single Branch? |
| | RF imbalance or Noise floor score |
| | RF imbalance or Noise floor issue? |
| | Uplink/Downlink imbalance score |
| | Uplink/Downlink imbalance issue? |
| | RF descriptor TMA Gain Specification score |
| | RF descriptor TMA Gain Specification issue? |
| | Possible DAS known to NodeB issue? |
| | Possible incorrectly setup DAS issue? |
| | Low UE Tx power score |
| | Low UE Tx power issue? |
| | Dominance: CPICH score |
| | Dominance: CPICH issue? |
| | Hardware score |
| | Hardware issue? |
| | PIM score |
| | PIM issue? |
| | External interference score |
| | External interference issue? |

FIG. 3

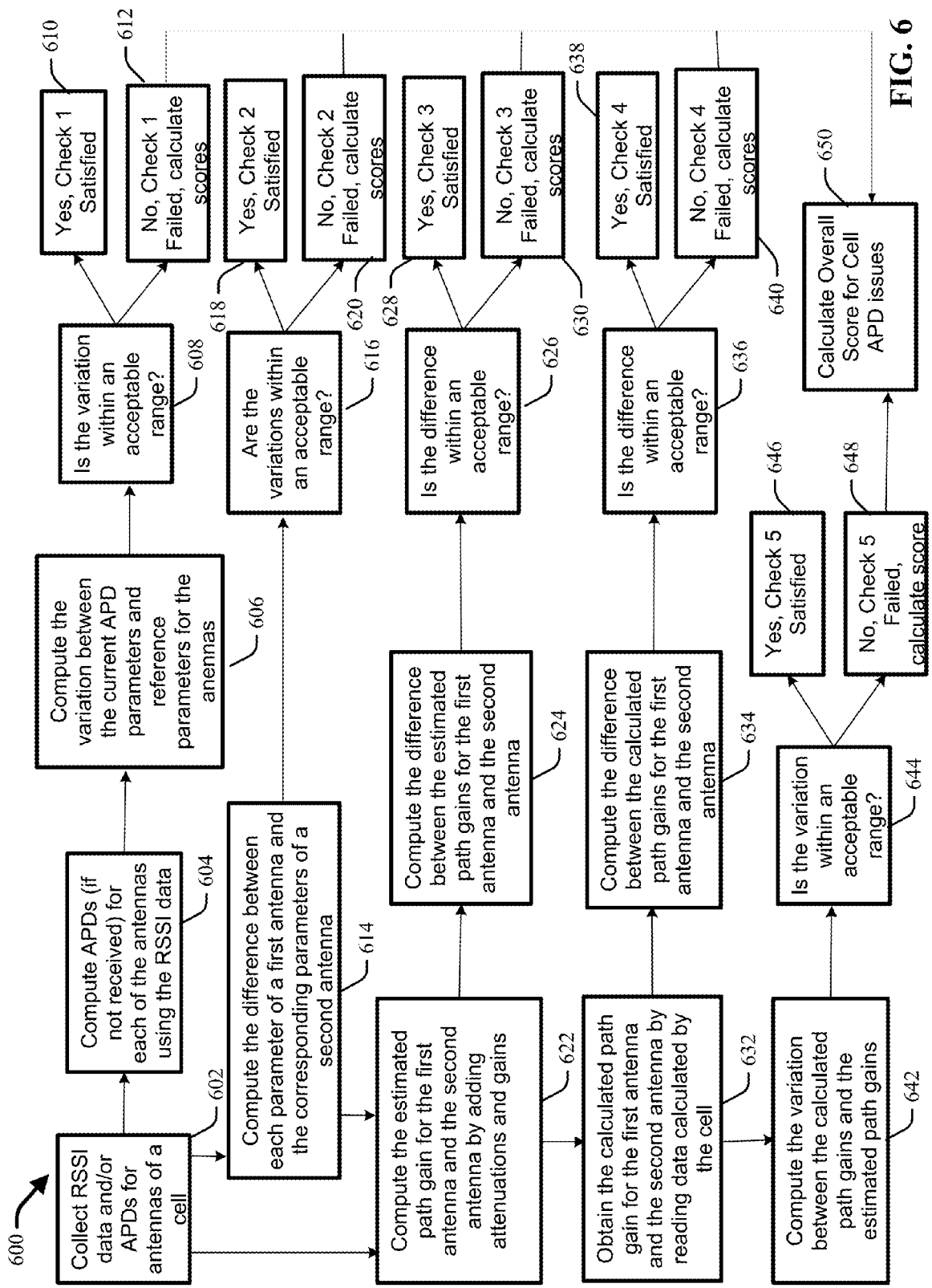

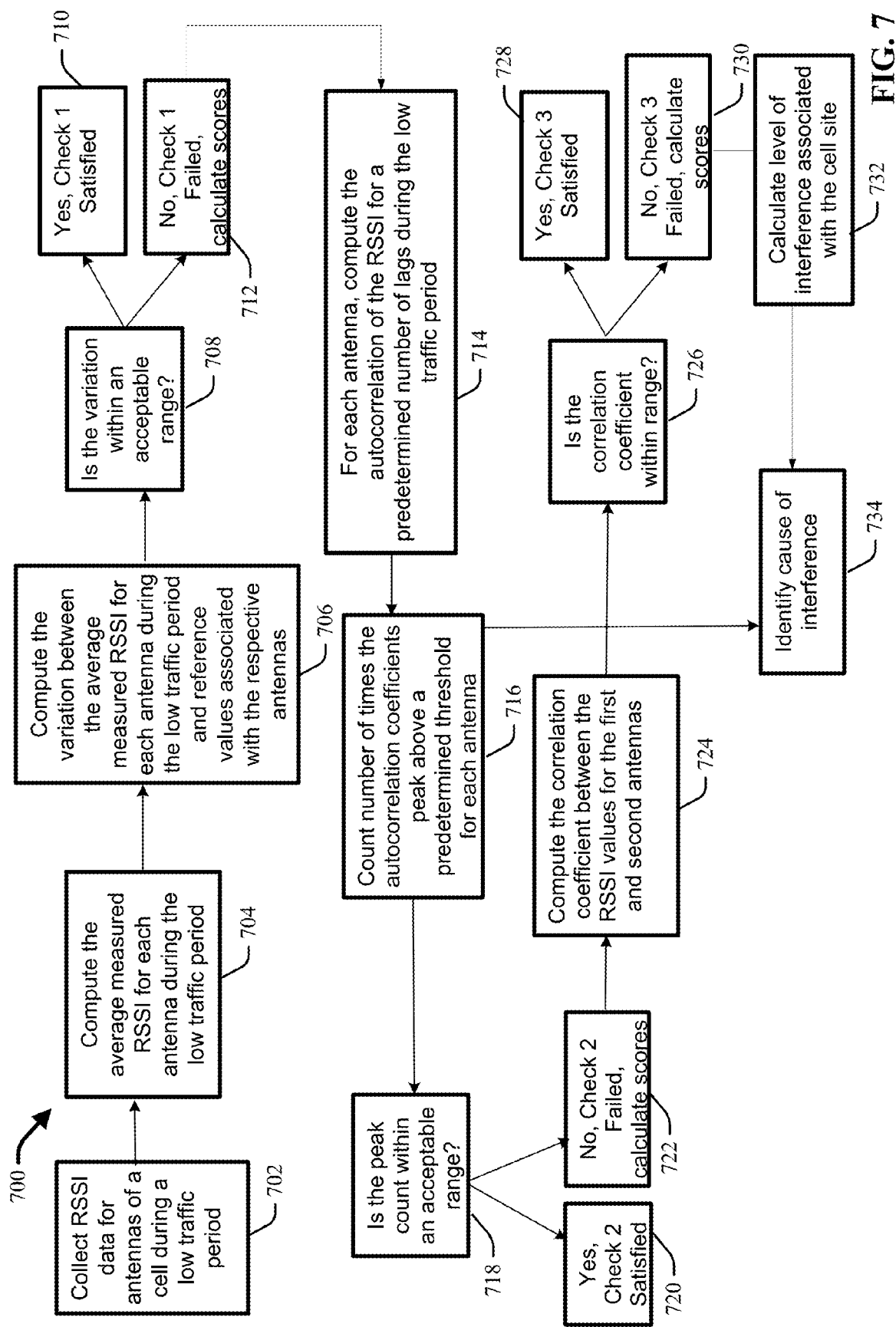

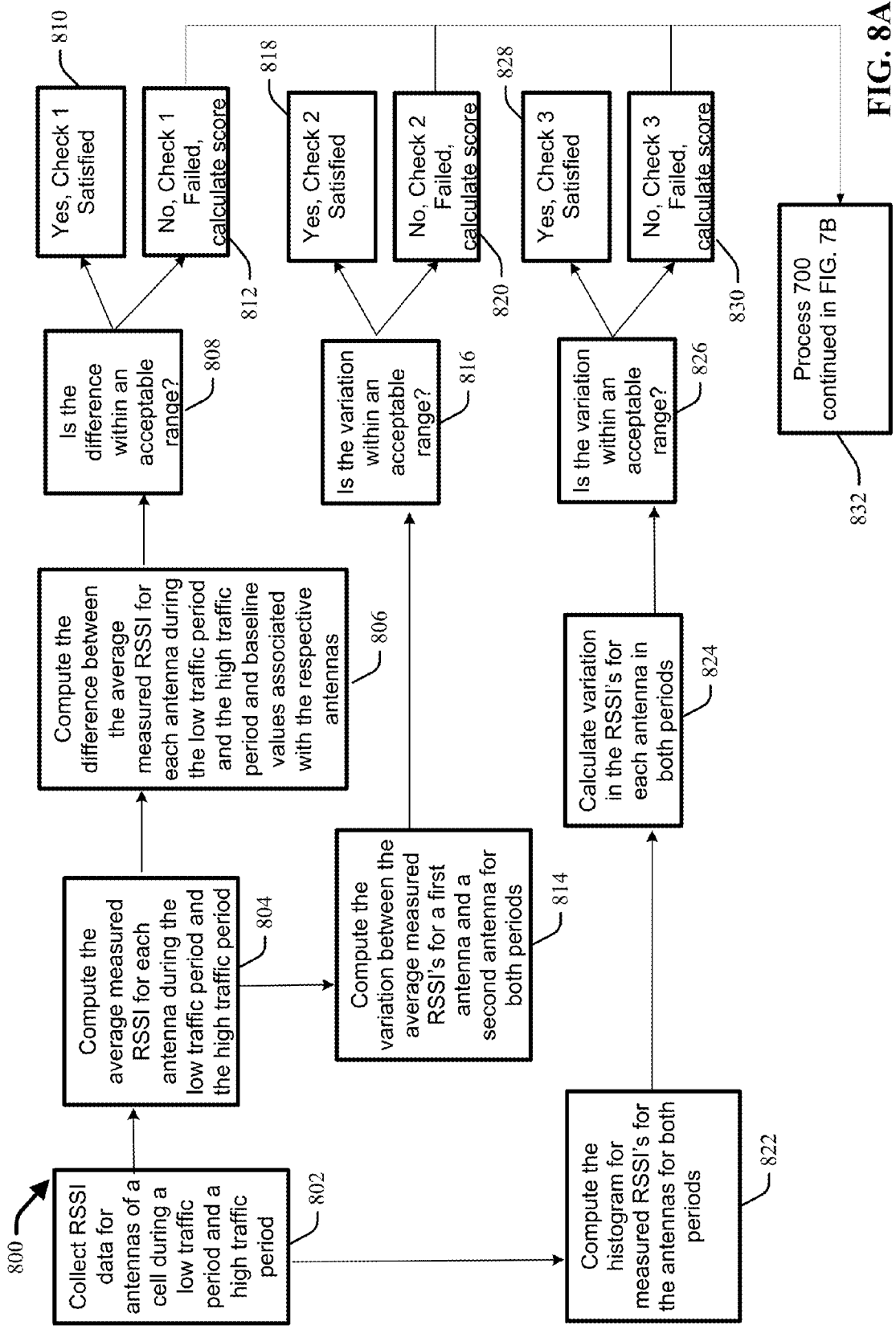

DIAGNOSIS OF CELLULAR NETWORK ELEMENT STATES USING RADIO FREQUENCY MEASUREMENTS

TECHNICAL FIELD

This disclosure relates generally to determining states of cellular network elements having an impact on uplink interference.

BACKGROUND

In radio reception, "noise" is the superposition of typically white noise (also called "static" noise) and other disturbing influences on a radio signal, caused either by thermal noise and other electronic noise from receiver input circuits or by interference from radiated electromagnetic noise picked up by the receiving antenna. For 3G technologies, like Code Division Multiple Access Systems (CDMA or UMTS), users of the system also generate uplink interference but it is generally below the level of the thermal noise since the signals are spread with orthogonal-like codes. This interference is considered normal and generally not considered as "excessive interference." However, at higher loads, users of the system may generate an aggregate interference load that exceeds that of the thermal noise floor. This increased interference can significantly degrade coverage and capacity of advanced cellular networks. Identification and classification of the various causes of noise increase on the uplink or uplink interference can be an extensive and tedious process, often requiring manual input and physical visits to individual network cell sites.

BRIEF DESCRIPTION OF THE DRAWINGS

FIG. 3 illustrates a chart of example information that can be included in a report by report component, in accordance with various aspects and embodiments described herein.

FIG. 6 presents a flow diagram of an example algorithm that can be employed by an antenna parameter descriptor (APD) analysis component of a network diagnostic platform to diagnose APD issues associated with a cell site, in accordance with various aspects and embodiments described herein.

FIG. 7 presents a flow diagram of an example algorithm that can be employed by an interference analysis component of a network diagnostic platform to diagnose interference issues associated with a cell site, in accordance with various aspects and embodiments described herein.

FIGS. 8A-8B present a flow diagram of an example algorithm that can be employed by a passive intermodulation (PIM) analysis component of a network diagnostic platform to diagnose PIM issues associated with a cell site, in accordance with various aspects and embodiments described herein.

DETAILED DESCRIPTION

Figure 1:
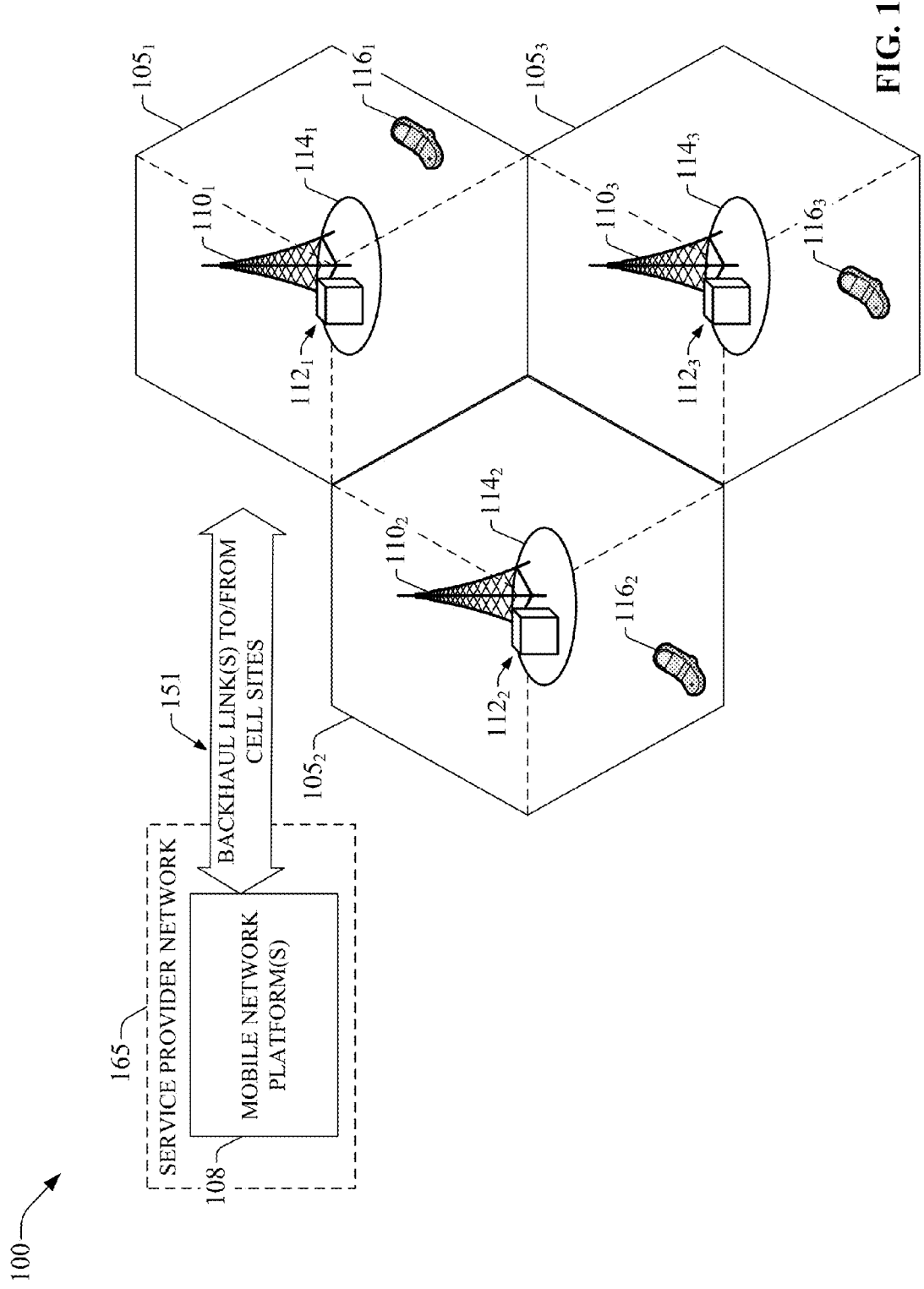
FIG. 1 illustrates a schematic wireless network environment that can operate, in accordance with various aspects and embodiments described herein.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As mentioned, identification and classification of the various causes of noise increase on the uplink (e.g., uplink interference) can be an extensive and tedious process, often requiring manual input and physical visits to individual network cell sites. As a result, remediation of the various causes of uplink interference has not been achieved in an efficient and effective manner. Accordingly, various embodiments herein address uplink interference, for example, by determining states of cellular network elements having an impact on uplink interference and characteristics of the cellular network contributing to uplink interference issues.

In one embodiment, a system is provided that comprises a memory to store instructions, and a processor, communicatively coupled to the memory, that facilitates execution of the instructions to perform operations, including receiving diagnostic data for a cellular network including strength data representative of strengths of radio frequency signals respectively received at a plurality of antennas of a base station of the cellular network, prior to demodulation, over a defined duration of time and at a defined sampling rate. The operations further include, based on analyzing the strength data, determining a state of a network element of the cellular network. In various aspects, the operations further include determining additional issues impacting uplink interference in the cellular network, including but not limited level of external interference, source of external interference and location of the source, inter-cell interference, incorrect uplink interference parameter settings, incorrect thermal noise settings, proximity of transmitting devices to a base station, and network capacity.

In another embodiment a method includes receiving, by a system including a processor, diagnostic data for a cellular network including strength data representative of strengths of radio frequency signals respectively received at a plurality of antennas of a base station of the cellular, prior to demodulation, over a defined duration of time and at a defined sampling rate. The method further includes, based on analyzing the strength data by the system, determining by the system, a state of a network element of the cellular network having an impact on uplink interference. In various aspects, the method further includes determining additional issues impacting uplink interference in the cellular network, including but not limited level of external interference, source of external interference and location of the source, inter-cell interference, incorrect uplink interference parameter settings, incorrect thermal noise settings, proximity of transmitting devices to a base station, and network capacity.

In yet another embodiment, disclosed is a tangible computer readable medium comprising computer executable instructions that, in response to execution, cause a system to perform operations, comprising, receiving diagnostic data for a cellular network including strength data representative of strengths of radio frequency signals respectively received at a plurality of antennas of a plurality of base stations of the cellular network, prior to demodulation, over a defined duration of time and at a defined sampling rate. The operations further comprise, based on analyzing the strength data, determining states of elements of the plurality of base stations that have a defined causal relationship with an increase in uplink noise in the cellular network from a previous state, and generating a report with information representative of the states of the elements.

With reference to the drawings, FIG. 1 is a schematic wireless network environment 100 that can operate in accordance with aspects described herein. Illustrative wireless network environment 100 includes a set of three macro cells $105_1$-$105_3$. It is noted, however, that deployments of coverage macro cells in typical cellular wireless networks range from $10^3$-$10^5$ macro cells. It should be appreciated that coverage macro cells $105_\mu$ ($\mu$=1, 2, 3) are illustrated as hexagons; however, coverage cells can adopt other geometries generally dictated by a deployment configuration or floor plan, geographic areas to be covered, and so on. Each macro cell $105_\mu$ is sectorized in a $2\pi/3$ configuration in which each macro cells includes three sectors, demarcated with dashed lines in FIG. 1. Other sectorizations are possible, and aspects or features of the subject innovation can be exploited regardless of type of sectorization.

Each macro cell $105_\mu$ ($\mu$=1, 2, 3 ... n) has a cell site $114_\mu$ associated therewith. A cell site comprises a portion of real estate, a base station tower $110_\mu$ that typically supports one or more antenna for telecommunication (e.g., radio frequency (RF), microwave, and/or satellite dish antennas), and additional sub-system $112_\mu$ that include devices that provide, at least in part, wireless coverage and operation of cell site. As an example, a sub-system $112_\mu$ in a cell site (e.g., cell $105_1$) can include air conditioning systems, direct current (DC) power systems, battery systems, smoke and intrusion alarm systems, and so forth. Additionally, a sub-system $112_\mu$ includes electronic circuitry or components that afford telecommunication in accordance to one or more radio technologies. In aspect, telecommunication is based at least in part on standardized protocols determined by the radio technology utilized for communication. In addition telecommunication can utilize one or more frequency bands, or carriers, which can include substantially all or all EM frequency bands licensed by the service provider (e.g., personal communication services (PCS), advanced wireless services (AWS), general wireless communications service (GWCS), and so forth), and substantially all or all unlicensed frequency bands currently available for telecommunication (e.g., the 2.4 GHz industrial, medical and scientific (IMS) band or one or more of the 5 GHz set of bands). Electronic circuitry or components within a sub-system $112m$ allow utilization of the various frequency carriers.

Cell sites $114_\mu$ and associated sub-systems $112_\mu$ are operated at least in part via mobile network platform(s) 108, which can be part of a service provider network 165, to provide wireless service. Mobile network platform(s) 108 facilitates circuit switched (CS)-based (e.g., voice and data) and packet-switched (PS) (e.g., internet protocol (IP), frame relay, or asynchronous transfer mode (ATM) . . . ) traffic and signaling generation, and delivery and reception for networked telecommunication in accordance with various radio technologies for disparate markets. Moreover, wireless network platform(s) 108 can control and manage base stations within sub-systems $112_\mu$ in disparate macro cells $105_\mu$ via, for example, a wireless network management component (e.g., radio network controller(s), cellular gateway node(s) . . . ). In cellular wireless technologies (e.g., 3rd Generation Partnership Project (3GPP) Universal Mobile Telecommunication System (UMTS), Global System for Mobile Communication (GSM)), wireless network platform 108 is embodied in a core network and a set of radio network controllers. It is noted that wireless network platform(s) 108 also can integrate disparate mobile networks (e.g., femto network(s), Wi-Fi network(s), femto cell network(s), broadband network(s), service network(s), enterprise network(s) . . . ) in which features or aspects of the subject innovation can be implemented.

In wireless network environment 100, mobile network platform(s) 108 can functionally connect with cell sites through backhaul link(s) 151 to/from cell sites. In an aspect, backhaul link(s) 151 can include wired link components like T1/E1 or T3/E3 phone lines; a digital subscriber line (DSL) either synchronous or asynchronous; an asymmetric DSL (ADSL); an optical fiber backbone; a coaxial cable, etc.; and wireless link components such as line-of-sight (LOS) or non-LOS links which can include terrestrial air-interfaces or deep space links (e.g., satellite communication links for navigation). Each cell site $105_\mu$ facilitates wireless communication between base stations $110_\mu$ and mobile devices $116_\mu$ (and other types of devices (e.g. fixed devices) configured to transmit and receive radio communications) located therein. Mobile devices $116_\mu$ can include any suitable communications device such as a cellular phone or smartphone. Although each of the cell sites $105_\mu$ are depicted with a single mobile device $116_\mu$, it should be appreciated that such depictions is merely presented for exemplary purposes and that a cell site $105_\mu$ can include any number N (where N is an integer) of mobile devices $116_\mu$. Communications from a base station $110_\mu$ to a mobile device $116_\mu$ are referred to as downlink communications while communication from a mobile device $116_\mu$ to a base station $110_\mu$ are referred to as uplink communications.

The disclosed subject matter presents systems and methods for diagnosing causes of noise increase associated with uplink communications within a schematic wireless network environment (e.g. environment 100). In radio reception, noise is the superposition of white noise (also called "static" noise) and other disturbing influences on the signal, caused either by thermal noise and other electronic noise from receiver input circuits or by interference from radiated electromagnetic noise picked up by the receiving antenna. In an aspect, the mobile network platforms 108 can include a network diagnostic platform that receives data from the cell sites $105_\mu$ (e.g. via backhaul link(s) 151) that can be used by the network diagnostic platform to diagnose ailments in the network related to noise increase on the uplink. Aspects and features of functionality and related advantages of the network diagnostic platform and management components associated therewith are described next in accordance with various aspects and embodiments of the subject disclosure.

Figure 2:
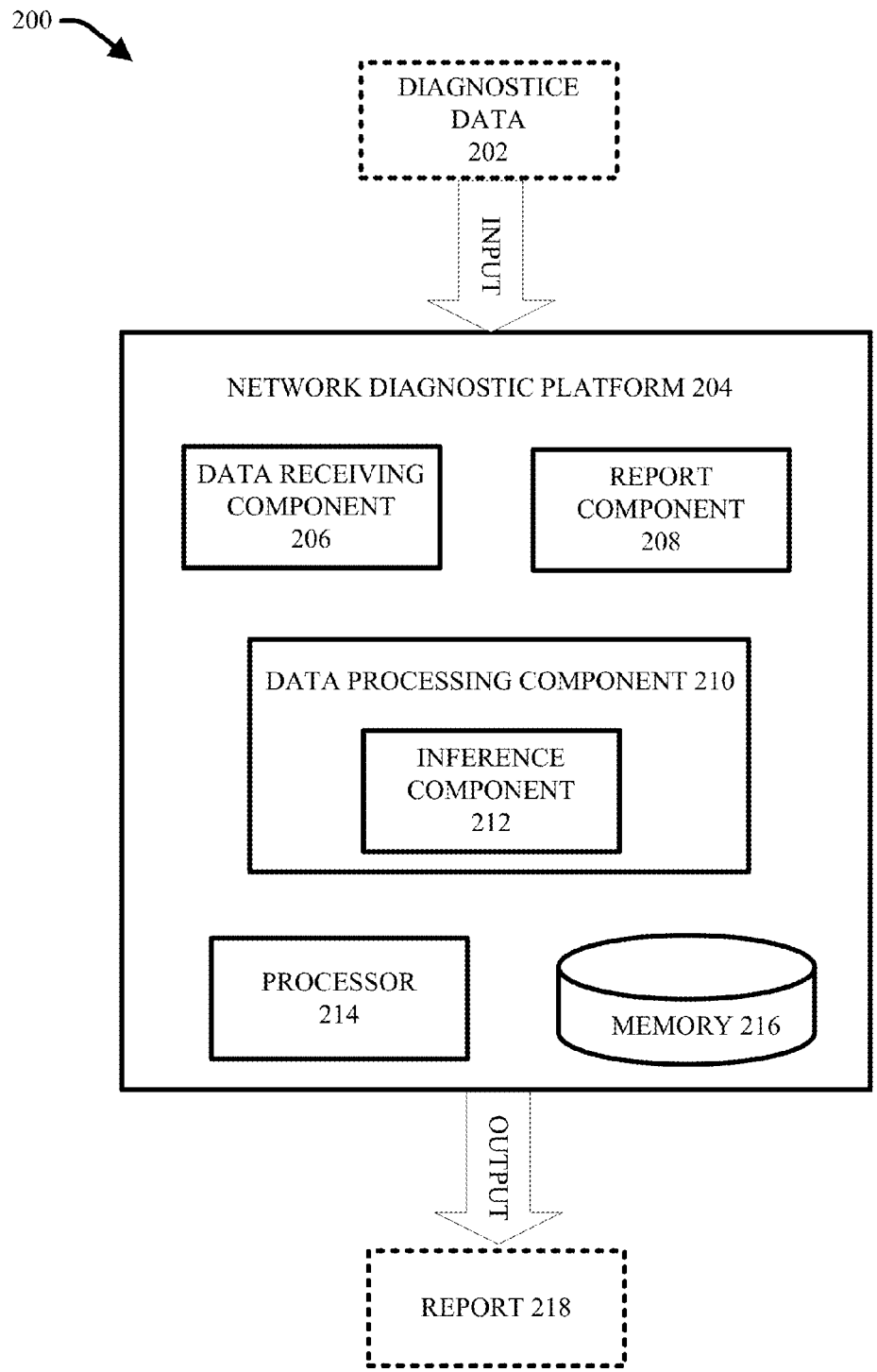
FIG. 2 illustrates a block diagram of an example system for determining states of cellular network elements having an impact on uplink noise increase, in accordance with various aspects and embodiments described herein.

Referring now to FIG. 2, presented is a system 200 for determining states of elements in a cellular network that have an impact on uplink noise increase in the cellular network, in accordance with aspects described herein. Aspects of apparatuses, systems or processes explained herein can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 200 includes a network diagnostic platform 202 that receives diagnostic data 202 from one or more cell sites (e.g. cell sites 105) of a cellular network. The network diagnostic platform 204 is configured to process the data 202 to determine or infer current characteristics of the network having an impact on uplink interference. In an aspect, the network diagnostic platform determines or infers states of one or more network elements. For example, the one or more network elements can include hardware associated with a base station or cell site. The states of the network elements can relate to physical condition of the hardware (e.g., whether the hardware is broken, malfunctioning, or improperly connected), parameter settings for the hardware referred to herein as antenna parameter descriptors (APDs), or level/degree of passive intermodulation (PIM) affecting the hardware (e.g., PIM affecting hardware such as diplexers, duplexers, and etc.). As used herein, an APD refers to a radio frequency (RF) parameter defining a state of a hardware element/component that connects a baseband unit of a base station to an antenna of the base station. An APD can describe a state of the baseband unit itself and the antenna itself. For example, an APD can describe the gains/losses of hardware generally referred to as the RF pluming associated with an antenna (e.g., amplifiers, combiners, splitters, cabling/connectors, and etc. associated with a particular antenna).

In addition, the network diagnostic platform 204 is configured to process the data 202 to identify, quantify, and/or locate external interference associated with the network (e.g., associated with a base station and/or cell site, e.g., cell site $105_\mu$). Further, the network diagnostic platform 204 can identify/diagnose other uplink interference issues such as inter-cell interference, incorrect uplink interference parameter settings, incorrect thermal noise floor settings, proximity of interfering user transmitting devices, network capacity, and etc.

In an aspect, the network diagnostic platform 204 can output information indicating the determined or inferred state of the one or more network elements and/or interference associated with the network (e.g. in the form of a report 218, alarm, or other signal). Network diagnostic platform 204 includes memory 216 for storing instructions (e.g., computer executable components and instructions). The network diagnostic platform 204 further includes a processor 214 to facilitate operation of the instructions (e.g., computer executable components and instructions) by the network diagnostic platform 204

In an aspect, the network diagnostic platform 204 is accessible to various external devices and systems via one or more networks (not shown). The one or more networks 114 can include but are not limited to a cellular network, a wide area network (WAD), or a local area network (LAN). For example, the network diagnostic platform 204 can communicate with one or more cell sites (e.g. cell sites $105_\mu$) via a cellular network in which the cell sites are employed and external system using internet protocol over a wide area network (WAN). However, network diagnostic platform 204 can communicate with cell sites and other systems and devices wirelessly using virtually any desired wireless technology, including, for example, cellular, WAN, wireless fidelity (Wi-Fi), Wi-Max, WLAN, and etc.

Network diagnostic platform 204 can include a data receiving component 206 that receives input data 202 from a cell site (e.g. from a component, device or system of the cell site). In an aspect, the input data includes raw (e.g., prior to demodulation, decoding, and/or down-conversion) radio frequency (RF) signals levels received at one or more antennas of a base station (e.g. base station sites $110_\mu$) of a cell site (e.g. cell sites $105_\mu$) of a wireless network. In particular, the input data 202 can include Received Signal Strength Indicators (RSSI) representative of power levels of signals received at each antenna of a multi-antenna base station over short periods of times (<1 second for example). An RSSI is a measurement of strength (e.g., power level) of RF signals received at an antenna prior to the baseband demodulation and/or decoding. An RSSI is measured before signal processing (e.g., before decoding, demodulation, and etc). In some aspects, the RSSI data is extracted after amplification. In other aspects, the input data 202 includes data representative of an RF signal received at a base station antenna that has been processed at the base station (e.g. data representative of an amplified, decoded, demodulated, analyzed, or otherwise processed after receipt by the antenna). The input data 202 can further include but is not limited to, alarm history for a base station antenna, received total wideband power (RTWP) data for a base station antenna (e.g., a measurement of the total level of noise referenced to the antenna connector), signal interference ratio (SIR) data for a cell site, and APDs (e.g. data indicating one or more parameters of an antenna/RF system), and voltage standing wave ratio (VSWR) normalization (for uplink gain subtraction) test data.

In an aspect, the input data 202 includes RSSI and/or RTWP data for each antenna of a multi-antenna base station includes multiple samples of RSSI/RTWP data collected over a relatively short and defined duration/window of time. As used herein, the duration of time in which samples are collected is referred to as the collection period and the rate/granularity at which samples are collected is referred to as the sampling rate. In an aspect, the sampling period can range from less than 1.0 millisecond to about 15 minutes. In one aspect, the sampling period is from about 1.0 seconds to about 10.0 minutes. In another aspect, a suitable sampling period is from about 5.0 seconds to about 5.0 minutes. In another aspect, a suitable sampling period is from about 10.0 seconds to about 1.5 minutes. Still, in yet another aspect, a suitable sampling period is from about 30 seconds to about 1 minute. In various aspects, the RSSI and/or RTWP is collected at a sampling rate of less than 1 millisecond to about 15 minutes. In one aspect, the sampling period is from about 100 millisecond to about 10.0 second. In another aspect, the sampling rate is from about 10 milliseconds to about 5.0 seconds. Still in yet another aspect, the sampling rate is from about 1.0 millisecond to about 1.0 second.

In an example, when RSSI data is collected for a period of 10 seconds at a rate of 10 milliseconds, the RSSI input data would include 1000 samples. In another example, the input data 202 can include RSSI and/or RTWP data collected for each antenna of a cell at a sampling rate of about 1.0 milliseconds for a period of about 10 seconds to about 2 minutes. In another example, the input data 202 can include RSSI and/or RTWP data collected for each antenna of a cell at a sampling rate of about 10 milliseconds for a period of about 1.5 minutes. In another example, the input data 202 can include RSSI and/or RTWP data collected for each antenna of a cell at a sampling rate of 100 milliseconds for a period of about 10 seconds to about 2 minutes. In yet another example, the input data 202 can include RSSI and/or RTWP data collected for each antenna of a cell at a sampling rate of 100 milliseconds for a period of about 1.5 minutes.

The RSSI and/or RTWP data can be collected at various frequencies. In an aspect, the RSSI and/or RTWP data is collected from each antenna of a cell site once every day. In another aspect, the RSSI and/or RTWP data is collected from each antenna of a cell site multiple times a day (e.g. every hour, every 2 hours, every 12 hours, and etc.). The RSSI and/or RTWP data is further classified as data collected during a period of high network traffic (e.g., from 7 am-7 pm) or data collected during a period of low network traffic (e.g., from 3 am -5 am). As used herein, high network traffic refers to a period where a cellular network has a traffic rate that approaches that of an average daily peak rate and low network traffic refers to a period where a cellular network has traffic rate that approaches that of an average daily minimum rate. For the uplink, the daily traffic peak rate generally coincides with the maximum RTWP interference periods. In a primary embodiment, the RSSI and/or RTWP data is collected twice a day, once during a period of high network traffic and once during a period of low network traffic. However, the RSSI and/or RTWP data can include data collected multiple times a day on a scheduled or continuous basis.

In an aspect, the input data 202 includes alarm history data for an antenna or cell site collected once a day. However, alarm history data can include alarm history of an antenna collected at any suitable rate (e.g. multiple times a day, once every two days, once a week, and etc.). The input data 202 can further include APDs and SIR data collected at any suitable rate (e.g. multiple times a day, once a day, every two days, once a week, and etc.). APDs are an integral part of advanced radio networks that describe various antenna/RF system parameters such as gains, attenuation, and delays. Estimated APD net gains can be calculated using RSSI and RTWP data. In an aspect, the input data merely includes RSSI data and the network diagnostic platform 204 calculates APDs for an antenna based on the received RSSI data.

In another aspect, the input data 202 includes calculated APDs for an antenna of a cell at a current point in time.

The input data 202 is employed by the network diagnostic platform 204 to determine or infer states of network elements having an impact on uplink noise increase (e.g., condition of hardware of a cell site (e.g., cell site $105_\mu$), APDs of antenna/RF of the cell site, and/or PIM associated with the hardware), and/or external interference present in the network. The input data 202 described above can be associated with a single network cell (e.g., cell site $105_\mu$) and/or a plurality of network cells (e.g., macro cells in typical cellular wireless networks range from $10^3$-$10^5$ macro cells). In this respect, in an aspect the network diagnostic platform 204 can monitor and diagnose the states/status of network elements, and/or level of interference, associated with a single cell. The network diagnostic platform 204 can further monitor and diagnose the overall health of a wireless network or subset of the network based on analysis and compilation of data from a plurality of cells.

Data processing component 210 is configured to process the input data 202 to determine at least a state or status of a network element/that has an impact on uplink noise and/or level/type of network interference. In particular, data processing component 210 can employ various algorithms and look-up tables stored in memory 216 to determine or infer physical condition of hardware, APDs for one or more antennas of a cell site, external interference present in a cell site, and PIM of cell site hardware, based on the input diagnostic data 202 collected for the cell site and received by the data receiving component 206. For example, the data processing component 210 can determine or infer if hardware of a cell is malfunctioning or improperly tuned. In another example, the data processing component 210 can determine whether APDs of an antenna are incorrectly set and the severity of the offset. In yet another example, the data processing component 210 can determine or infer a level of external interference present in a cell site and the type of external interference. Still in yet another example, the data processing component can determine the existence and severity of PIM affecting cell site hardware. Processing of input data with respect to analyzing states of various network elements and analyzing network interference described herein is discussed infra with respect to FIGS. 4-8B).

The data processing component 210 can include an inference component 212 to facilitate making inferences or determinations in connection with analyzing a state/status of a network element/characteristic. In order to provide for or aid in the numerous inferences described in this disclosure, inference component 212 can examine the entirety or a subset of data to which it is granted access in order to provide for reasoning about event management and planning decisions. Inference component 212 can be granted access to any information associated with system 200 (and additional system described herein), including information received or generated by system 200, information stored in memory 216 (e.g., algorithms, look-up tables, remediation information and etc.) as well as accessible extrinsic information accessible to the network diagnostic platform 204 via one or more networks (not shown).

Inference component 212 can perform inferences to identify a specific context or action, or to generate a probability distribution over states, for example. The inferences can be probabilistic—that is, the computation of a probability distribution over states of interest based on a consideration of data and events. An inference can also refer to techniques employed for composing higher-level events from a set of events or data. Such inference can result in construction of new events or actions from a set of observed events or stored event data, whether or not the events are correlated in close temporal proximity, and whether the events and data come from one or several event and data sources. Various classification (explicitly or implicitly trained) schemes or systems (e.g., support vector machines, neural networks, expert systems, Bayesian belief networks, fuzzy logic, data fusion engines, etc.) can be employed in connection with performing automatic or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used in this disclosure also is inclusive of statistical regression that is utilized to develop models of priority.

Report component 208 is configured to report findings (e.g. determinations and inferences) made by the data processing component 210 regarding the state of a network element (e.g., hardware conditions, APDs, and/or PIM) and/or external interference associated with a cell site. In an aspect, the report component 208 can generate such reports in real-time or substantially real-time. For example, a report can include information indicating a current state of a network element/characteristic based on input data as it is received. In this respect, network diagnostic platform 204 can receive diagnostic data from a cell site as it is generated/collected at the cell site, process the data, and output information indicating a status or state of a network element in substantially real-time. Thus the report component 208 can report current and real-time feedback of network elements. As a result, issues/problems with network elements can be efficiently identified and thus efficiently remediated. In another aspect, the report component can generate a report based on compiled information collected over a period of time. For example, the report component 208 can generate weekly reports for a cell site based on data collected and processed data for the cell site over a weekly period.

In yet another aspect, report component 208 can generate a report having information regarding the state of network elements, and/or external interference, associated with one or more cells in a cellular network (e.g. network 100). According to this aspect, the report can be use the identify network cells with hardware malfunctions, APD issues PIM issues, and external interference issues that need remediation. In an example, report component 208 can generate a report having rows and columns of information. In an aspect, each row in the report can represent a network cell (e.g. cell $105_\mu$) and each column can represent a various scores/information for that cell with respect to network elements/characteristics. Compiled reports generated by report component 208 can also be used to monitor the health of a network cell or the network itself and to study the performance of the diagnosis algorithms.

Moving ahead, FIG. 3, presents a chart 300 of example information that can be included in a report by report component 208. Looking at chart 300, the first few columns of a report can include housekeeping information 302 for a cell, such as the cell name, local identification (ID), _Radio Network Controller (RNC), market, whether the cell was repaired, the date(s) of repair, and dates for which analysis is performed. Additional columns can include configuration parameters 304 for the cell, and overall scores 306 for analyzed elements/characteristics of the cell. It should be appreciated that a report is not limited to such information presented in chart 300. For example, a report can include detailed information regarding analysis performed for each network element (e.g., hardware condition, APD, interference, and PIM). According to this example, a report can include a breakdown of the scores/information determined with respect to a plurality of tests/checks performed for each antenna of a base station during the analysis a network element/characteristic state or status.

Figure 9:
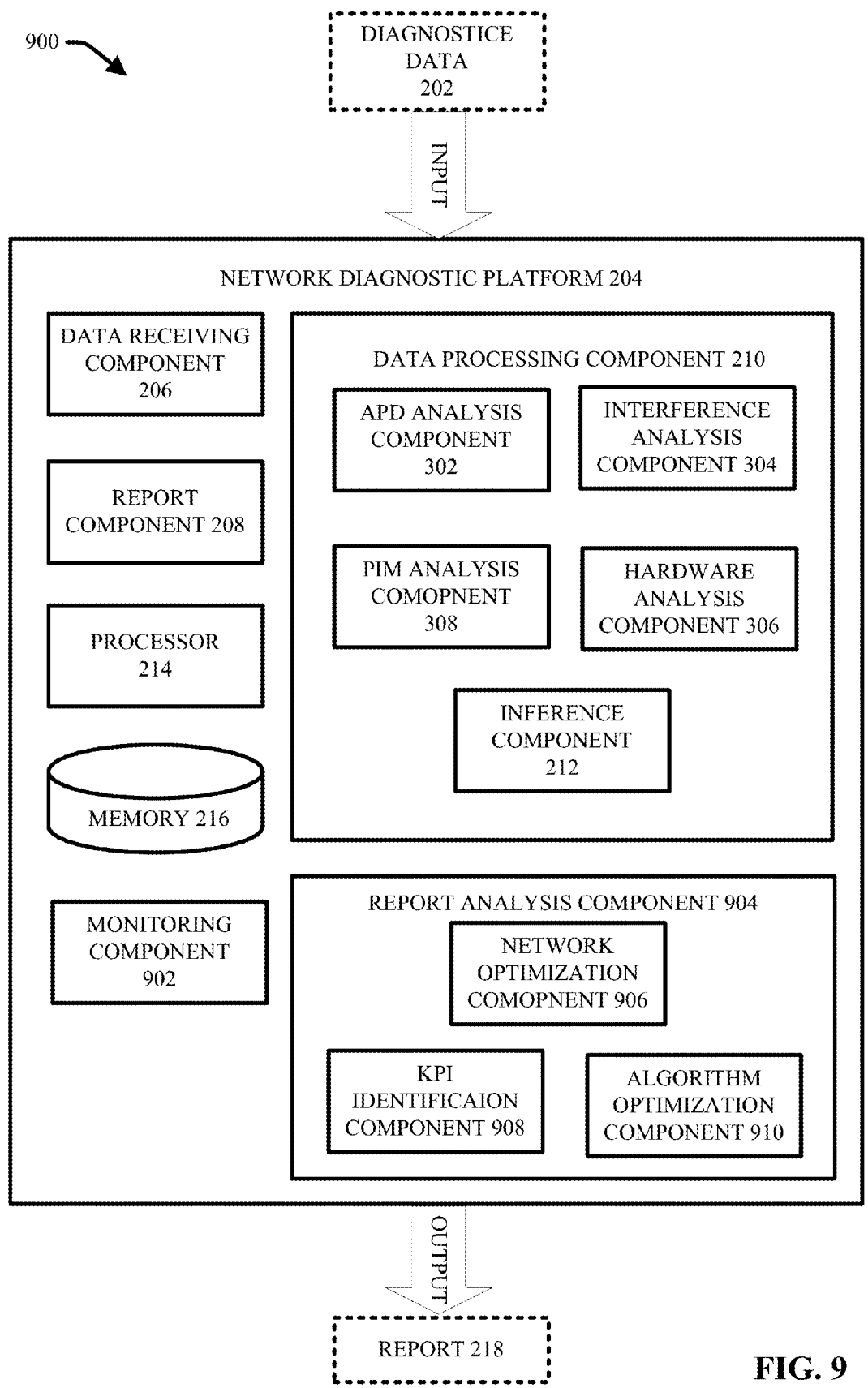
FIG. 9 illustrates a block diagram of another example system for determining states of cellular network elements having an impact on uplink noise increase, in accordance with various aspects and embodiments described herein.

In an aspect, the report can be employed by a technician (and/or a computer implemented report analysis component 904 as discussed infra with respect to FIG. 9) to analyze issues associated with a plurality of cells of a cellular network. For example, the report can summarize hardware issues, APD issues, interference issues and PIM issues for each cell in the cellular network. The report can then be analyzed to identify particular cells affected with one or more of hardware issue, APD issues, interference issues and PIM issues and to determined remedial measures to correct the issues.

Figure 4:
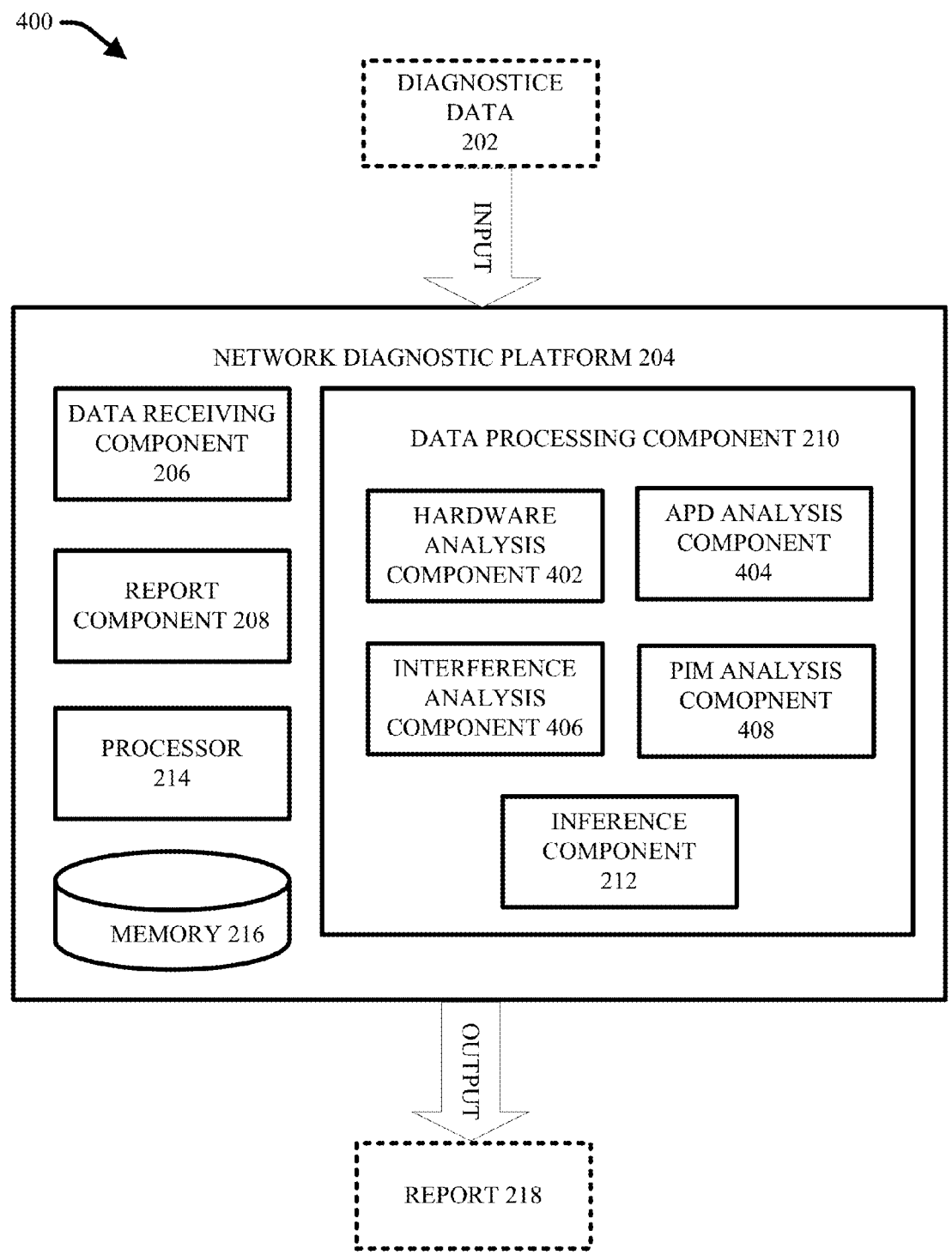
FIG. 4 illustrates a block diagram of another example system for determining states of cellular network elements having an impact on uplink noise increase, in accordance with various aspects and embodiments described herein.

Turning now to FIG. 4, presented is another system 400 for determining a state or status of a network element having an impact on uplink noise increase, in accordance with aspects described herein. Repetitive description of like elements employed in respective embodiments of systems and devices described herein are omitted for sake of brevity. System 400 is similar to system 200 with the addition of various components to the data processing component 210. In particular, data processing component 210 can include hardware analysis component 402, APD analysis component 404, interference analysis component 406, and PIM analysis component 408. The components 402-406 are configured to analyze radio diagnostic data received at one or more antennas of one or more base stations to determine or infer network characteristics/problems related to hardware settings and physical condition, interference and PIM affecting hardware. In various aspects, the components 402-406 analyze radio diagnostic measurements (e.g., RSSI data) received at two or more antennas of one or more base stations, at the same time or substantially same time.

Hardware analysis component 402 is configured to analyze received diagnostic data 202 to determine and/or infer a cell site hardware issue. As used herein, the term hardware issue refers to improper performance of hardware, including the physical condition of the hardware. Proper functioning of hardware is critical for the performance of any system. Hardware issues significantly impact the performance of advanced radio networks and can cause noise uplink noise increase. For example, hardware issues in advanced radio networks often result in loss of diversity gain, and significantly impact coverage, capacity, and quality of service. For example, a hardware issue that can impact network noise when faulty can include failure of an amplifier to maintain adequate levels of gain resulting in diversity imbalance.

Hardware issues are typically not diagnosed at a cell site until it becomes a relatively serious problem. The hardware analysis component 402 utilizes RF diagnostic measurements associated with signals received by one or more antennas of a base station (e.g., RSSI data and/or RTWP data) and hardware alarm history to quickly and automatically diagnose hardware issues for remediation. Thus, network diagnostic platform 204 facilitates diagnosis of cell site hardware issues in an automated fashion so that repairs can be performed proactively.

In an aspect, hardware analysis component 402 analyzes radio diagnostic measurements collected for each antenna of a multi-antenna base station. For example, the diagnostic data 202 can include RSSI data for two antennas collected periodically (e.g., once a day) for a short period of time (e.g. 1.0 minutes) at a granularity or sampling rate of 10 milliseconds. The hardware analysis component 402 can also employ hardware alarm history data to accurately diagnose whether an antenna has a hardware issue. Further, the hardware analysis component can employ voltage standing wave ratio (VSWR) measurements to further diagnose hardware issues. In some aspects, VSWR measurements for a cell site are received as diagnostic input information 202. In other aspects, the hardware analysis component can perform a VSWR test to obtain VSWR measurements.

The hardware analysis component 402 can employ one or more algorithms stored in memory 216 to analyze diagnostic input data to determine or infer a hardware issue and the severity of the issue. In particular, the hardware analysis component 402 can employ one or more algorithms to infer or determine hardware issues based on various indicators. For example, RF measurements that are below the thermal noise floor for either branch indicate possible hardware issues. In another example, RF measurements that do not vary sufficiently for an antenna with known increase in network traffic indicates a hardware issue. In yet another example, RF measurements that show significant diversity imbalance between two antennas of a multi-antenna base station can additionally confirm hardware failures. Hardware alarms that were triggered recently (within the past few days) are also used by the hardware analysis component to determine or infer issues in hardware.

APD analysis component 404 is configured to analyze diagnostic input data 202 to identify cell sites with incorrect APD entries and potentially propose the correct settings. Antenna parameter descriptors (APD) are an integral part of advanced radio networks that describe various antenna parameters such as gains, attenuation, and delays. APDs can describe parameter settings for various hardware elements that constitute the RF pluming of a cell site, including the baseband unit, the antenna, and the hardware intervening between the baseband unit and the antenna. APDs significantly impact the overall performance of advanced radio networks. Incorrect entries can lead to perceived diversity imbalances, and incorrect noise floor estimations resulting in degradation of overall system performance impacting coverage, capacity, and quality. Network diagnostic platform 204, via APD analysis component 404, facilitates diagnosing errors in these descriptors in a quick and automated fashion using radio diagnostic measurements and antenna parameter entries as input data 202.

In an aspect, APD analysis component analyzes radio diagnostic measurements collected for each antenna of a multi-antenna base station to facilitate determining APD entry issues. For example, the diagnostic data can include RSSI data for two antennas collected periodically (e.g., once a day) for a short period of time (e.g. 1.0 minutes) at a granularity or sampling rate of 10 milliseconds. In an aspect, the APD analysis component 404 uses the RF measurement data to compute current APDs for each antenna using the RF measurement data and compares the current APDs to reference APD values for the antenna to determine or infer inaccuracies between the current APDs and the reference APDs. In an aspect, the reference APD values are included in the diagnostic input data 202. In another aspect, the reference APD values are stored in memory 216.

In some aspects, rather than calculating current APD data from received RSSI values, the input data 202 can include pre-calculated current APDs for a cell site. For example, the input data can include APDs such as band, antenna number, Manual Rx. Attenuation (MRA), Misc. Rx. Gain (MRG), and Tower Top Low Noise Amplifier (TTLNA) Gain.

The APD analysis component 404 can employ one or more algorithms stored in memory 216 to analyze diagnostic input data to determine or infer incorrect APD settings. In particular, the APD analysis component 404 can employ one or more algorithms to infer or determine APD issues based on various indicators. For example, errors in APD settings can be indicated when any of the APD settings vary significantly from the reference settings or are entered in formats that the system cannot identify. Additional errors can be inferred when there are imbalances in APD entries between antennas of multi-antenna base station, or when the APD entries for an antenna vary significantly from the radio diagnostic measurement for that antenna. In an aspect, a correction to an APD setting can be inferred from identifying an incorrect entry and inferring the imbalance from received radio diagnostic measurements. Since the radio diagnostic measurement APDs can be collected from a cell site in a periodic fashion, the APD analysis component 404 can efficiently diagnose and potentially correct APD errors in a large-scale manner.

Interference analysis component 406 is configured to analyze received diagnostic data 202 to determine and/or infer various interference characteristics associated with one or more cell sites (e.g., external interference affecting signals received at a cell site). In particular, the interference analysis component 406 can determine and/or infer a level of external interference, a source of external interference, a location of the source of external interference, and proximity of a transmitting user device to a base station.

The interference problem can significantly impact coverage, capacity, and quality of service for a cellular network and can be extremely difficult to locate by existing manual processes since it relies on a crew with a spectrum analyzer and a highly directional antenna to locate the possible source of interference in the band. This takes a great deal of expertise to find it and also estimate the potential impact to the radio base station. Thus, if expertise is not available the interference can be impacting to the system performance for extended periods of time. The interference analysis component 406 analyzes received radio diagnostic measurement data to identify, quantify, and locate external interference in an efficient and automated fashion.

In an aspect, in order to diagnose interference issues, the interference analysis component 406 employs existing diagnostic measurement data used for confirming installation procedures and exploits this data to identify accurately the characteristics of external interference. In an aspect, the existing diagnostic data is included in the input data 202. In another aspect, the existing diagnostic data is stored in memory 216. The interference analysis component 406 further analyzes radio diagnostic measurements received (e.g., at the same time or substantially the same time) at each antenna of a multi-antenna base station to facilitate determining interference issues. For example, the diagnostic data can include RSSI data for two (or more) antennas simultaneously (e.g., at the same time or substantially same time) collected periodically (e.g., once a day) for a short period of time (e.g. 1.0 minutes) at a granularity or sampling rate of 10 milliseconds.

The interference analysis component 406 can employ one or more algorithms stored in memory 216 to analyze diagnostic input data to determine or infer interference issues. In particular, the interference analysis component 406 can employ one or more algorithms to infer or determine a quantity, source and/or location of interference based on various indicators. In an aspect, the existence and severity of an external interfering signal can be inferred by comparing RF signals collected for each antenna of a multi-antenna base station. For example, the interference analysis can determine a correlation coefficient between RSSI signals received at two antennas of a base station at the same time. Where the correlation coefficient is outside at reference value or range, the interference analysis can determine/infer a level of interference affecting the base station or antennas of the base station. In addition, the external interference component 406 can quantify the level of external interference as a function of the degree in which the correlation coefficient deviates from the reference value/range.

In another aspect, the interference analysis component 406 can analyze the periodicity of signals received at one or more antennas of a base station to determine/infer a source of interference. For example, the interference analysis component 406 can auto correlate a predetermined number of RSSI samples (e.g., every single sample, every set of 5 samples, every set of 10 samples, and etc.) received at an antenna over a given sampling period. The interference analysis component 406 can then analyze the auto-correlation data to quantify any periodic variation in the received samples. In particular, the interference analysis component 406 can examine peaks in the auto-correlation data that rise above a predetermined threshold to determine or infer a source/type of interference. In an aspect, the interference analysis component 406 can perform auto-correlation of each antenna of a multi-antenna base station and compare the respective auto-correlation data to facilitate determining a source of interference. The interference analysis component can identify sources of interference because determined correlation coefficients between antennas and periodicity of single antenna, determined as a function of received RSSI data, is unique for many common forms of interference such as intermodulation products in repeaters, strobe light interference, narrowband interference, etc. This uniqueness can be exploited to quickly and accurately identify and possibly locate the interference (e.g., strobe light will be on the tower structure, etc.) in an automated fashion. The interference analysis component 406 further allows timely identification of the interference since the RF data can be measured periodically.

In yet another aspect, the interference analysis component 406 can employ cross-correlation of RSSI samples received (e.g., at the same time) at two or more antennas of a single base station and/or RSSI samples received at antennas of different base stations to locate a source of interference. For example, the interference analysis component 406 can determine a correlation coefficient between RF signals simultaneously at two antennas of a single base station and/or received simultaneously at an antenna of the single base station and an antenna of another base station. The correlation coefficients can facilitate geo-locating a source of interference. It should be appreciated that although the above example referenced cross-correlation between RF signals received simultaneously (or substantially simultaneously) at two antennas of one or two base stations, the interference analysis component 406 can cross-correlate RF data received simultaneously at a plurality of antennas of a plurality of base stations.

In addition, the interference analysis component 406 can locate the proximity of a transmitting user device to a base station based on signal interference ratio (SIR) data for one or more antennas of a base station. The interference analysis component 406 can receive the SIR data for an antenna and/or compute the SIR data using received RSSI data for an antenna. The interference analysis component 406 can compute the difference between a current SIR for an antenna and a target or reference (e.g., optimal) SIR for that antenna. The interference analysis component 406 can then determine a proximity of a transmitting user device to a base station at which the antenna is employed based on the difference. For example, where the difference is positive and higher than a predetermined threshold, the interference analysis component 406 can infer/determine that a transmitting user device is too close to the base station, thus causing uplink interference.

Further, in addition to interference affecting a single cell site, the interference analysis component 406 can infer/determine a level of inter-cell (e.g., between cell sites of a cellular network) interference. The interference analysis component 406 can employ various parameters to facilitate determining/inferring a level of inter-cell interference. In an aspect, the interference analysis component 406 employs determined/inferred information regarding uplink interference (as discussed above) for two or more cells to determine a level of interference between the two or more cells. In addition to or in the alternative of measures of uplink interference, the interference analysis component 406 can employ received, stored, and/or calculated information regarding downlink interference associated with the two or more cells (e.g., active set and detected set members), distances between base stations of the two or more cells, and/or heights of base stations of the two or more cells, in order to determine/infer a level of inter-cell interference.

PIM analysis component 408 is configured to configured to analyze received diagnostic data 202 to determine and/or infer PIM issues present in a cell site. PIM occurs in passive devices (which may include cables, antennas and etc.) that are subjected to two or more high power tones. The PIM product is the result of the two (or more) high power tones mixing at device nonlinearities such as junctions of dissimilar metals, metal-oxide junctions and even loose connectors. The higher the signal amplitudes, the more pronounced the effect of the nonlinearities, and the more prominent the PIM that occurs.

PIM is one of the important causes of uplink noise rise and diversity imbalance related issues in advanced radio networks. This can again result in degradation of coverage and capacity of these networks. PIM is generally caused by RF plumbing issues relating to faulty cables, connectors, or poor connections that cause non-linearities resulting in intermodulation products that can fall into the uplink band even though they may originate in the downlink band. PIM generation follows network traffic patterns, being low in the non-congested hours and rising during the more congested hours. Identifying PIM issues typically requires either a direct visit to the cell site, or running an orthogonal channel noise source (OCNS) test, or in some cases, modification of certain power parameters. However both OCNS testing and parameter modification tests can negatively impact system performance. The network diagnostic platform 204 overcomes these issues by using radio diagnostic measurements to classify PIM issues and measure their impact on network performance.

In an aspect, PIM analysis component 408 analyzes radio diagnostic measurements collected for each antenna of a multi-antenna base station during a period of high network traffic and a period of low network traffic. For example, the diagnostic data 202 can include RSSI data for two antennas collected once or twice a day (e.g., once during high network traffic periods and once during low network traffic periods) for a short period of time (e.g. 1.0 minutes) at a granularity or sampling rate of 10 milliseconds.

The PIM analysis component 408 can employ one or more algorithms stored in memory 216 to analyze diagnostic input data to determine or infer a PIM issue. In particular, the PIM analysis component 408 can employ one or more algorithms to classify and quantify a PIM issues based on various indicators. For example, PIM causes significant variation in the RF measurements on a duplex antenna during high traffic periods. Therefore, the histogram of the RF measurements of a duplex antenna during high traffic periods can be used by the PIM analysis component 408 to analyze such variation in order to identify and quantify PIM issues. Further, the effects of PIM are different on different antennas. Accordingly, the PIM analysis component 408 can analyze variances in RF measurements between different antennas of a multi-antenna base station to identify and quantify PIM issues. For example, an indication of PIM is inferred/determined where the RF measurements (e.g., RSSI samples and/or histogram patterns of the RSSI samples) are significantly different (e.g., outside a predetermined deviation threshold) for a first antenna compared to a second antenna during high traffic periods.

PIM also causes the range of RSSI's (the difference between the maximum and minimum RSSI) to be different on multiple antennas. Accordingly, the analysis component can also employ differences in RSSI range for multiple antennas to classify PIM. Finally, when there is minimal network traffic, two or more antennas of multi-antenna base station should behave normally. Hence, an abnormal behavior identified by the above metrics when there is high traffic, and a normal behavior observed in the absence of significant traffic can be used by the PIM analysis component 408 to diagnose a potential PIM issue. The PIM analysis component 408 can also identify the severity of a PIM issue by calculating the degree at which the RF measurements of different antennas of a multi-antenna base station differ from each other when there is high network traffic.

Figure 5:
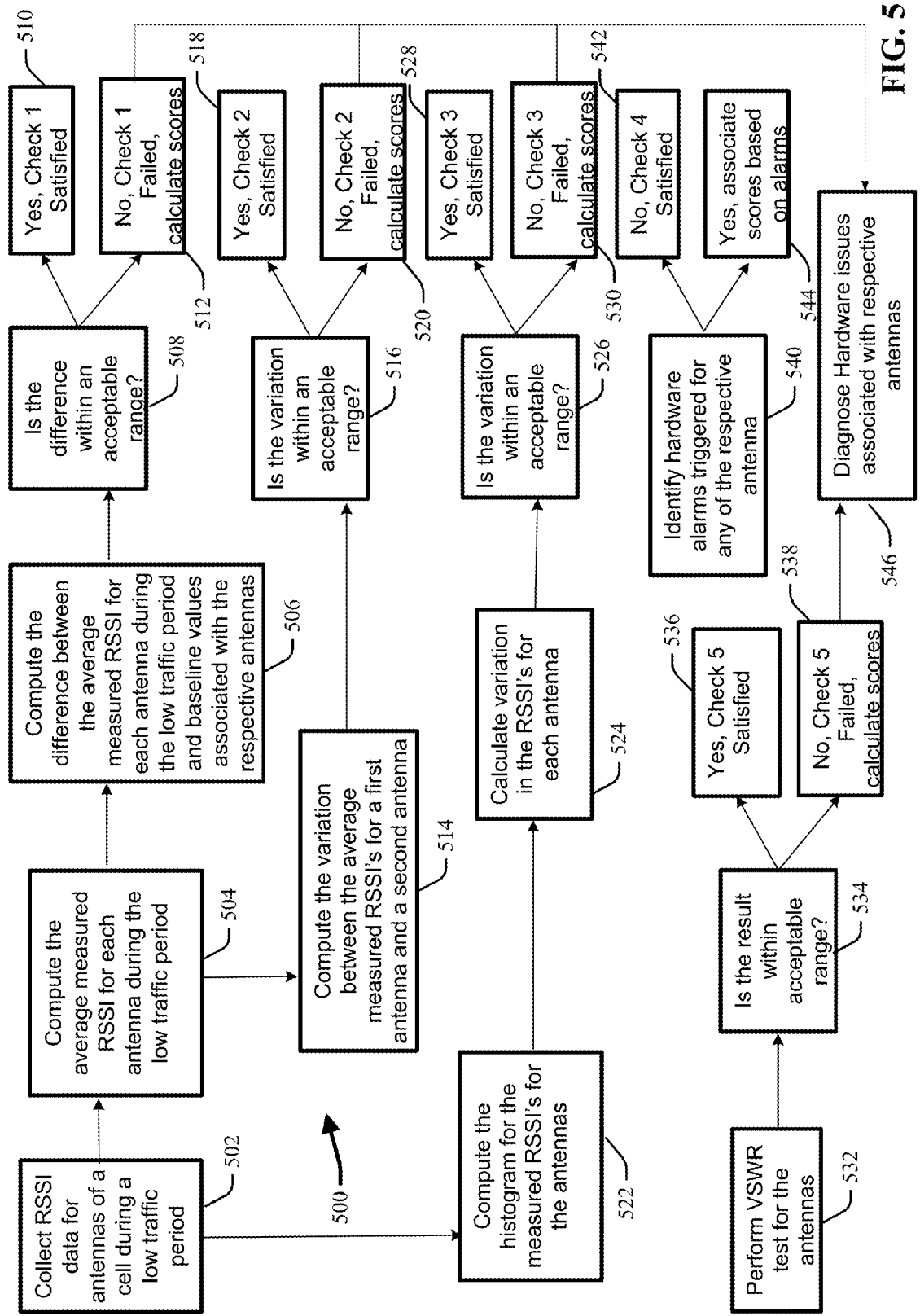
FIG. 5 presents a flow diagram of an example algorithm that can be employed by a hardware analysis component of a network diagnostic platform to diagnose hardware issues associated with a cell site, in accordance with various aspects and embodiments described herein.

Referring now to FIG. 5, presented is a flow diagram 500 of an example algorithm that can be employed by the hardware analysis component 402 of the network diagnostic platform 204 to diagnose hardware issues associated with a cell site. At 502, RSSI data is collected for one or more antennas of a cell site during a low traffic period. The RSSI data is then sent to and received by the a network diagnostic platform 204 for processing thereof by the data processing component 210. Process 500 specifically exemplifies processing of the input data by hardware analysis component 402. Process 500 will be described with the assumption that the cell site includes two antennas, however, it should be appreciated that one or more aspects of process 500 can be employed for a cell site having any number N of antennas.

At 504, the average measured RSSI for each antenna is computed. At 506, the difference between the average measured RSSI for each antenna and baseline values for the respective antennas is measured. Baseline values for an antenna's anticipated performance can be stored by the network diagnostic platform 204 and/or sent to the network diagnostic platform as input data. For example, a vendor can provide the baseline RF values to the network diagnostic platform 204. At 508, the hardware analysis component 402 determines whether the difference is within an acceptable range for one or both antennas. If it is acceptable, at 510, check 1 is considered satisfied. If it is not acceptable, for one or both antennas, check 1 is considered failed and scores are associated with each antenna that reflect the severity of the variation.

At 514, the variation between the average measured RSSI for each of the antennas is computed. At 516, the hardware analysis component 402 then determines whether the variation is within an acceptable range for one or both antennas. If it is acceptable, at 518, check 2 is considered satisfied. If it is not acceptable, for one or both antennas, at 520, check 2 is considered failed and scores are associated with each antenna that reflect the severity of the variation.

At 522, the hardware analysis component 402 computes the histogram for the measured RSSI sample values for reach of the antennas. For example, when RSSI data is collected for a for a period of 10 seconds at a rate of 10 milliseconds, the RSSI input data would include 100 samples. At 524, the hardware analysis component then analyzes and computes relative variations in the RSSI's for each antenna. At 526, the hardware analysis component 402 then determines whether the variation is within an acceptable range for one or both antennas (e.g. does not vary beyond a predetermined threshold). If it is acceptable, at 528, check 3 is considered satisfied. If it is not acceptable, both antennas, at 530, check 3 is considered failed and scores are associated with each antenna that reflect the severity of the variation.

At 540, the hardware analysis component identifies whether any hardware alarms were triggered for either antenna and employ this data to further confirm a hardware issue. At 542, if there are no hardware alarms, check 4 is considered satisfied. However, if one or both antennas are affiliate with a hardware alarm, at 544 check 4 is considered failed and scores are associated with the respective antennas based on the alarms. At 532, a VSWR test is performed and/or VSWR data is received by the network diagnostic platform 204. At 534, the hardware analysis component 402 then determines whether VSWR results are within an acceptable range for one or both antennas (e.g. does not vary beyond a predetermined threshold). If it is acceptable, at 536, check 5 is considered satisfied. If it is not acceptable, for one or both antennas, at 538, check 5 is considered failed and scores are associated with each antenna that reflect the severity of the variation outside the predetermined threshold.

At 546, the hardware analysis component diagnoses the existence and severity of hardware issues based on the results of Checks 1-5. For example, if check 1 is not satisfied and the difference is negative, a hardware issue is determined with a severity score based on the difference. In another example, if check 2 is not satisfied and check 3, check 4, or check 5 is not satisfied, hardware issue is determined with a severity score based on the scores calculated in step 2.

Referring to FIG. 6, presented is a flow diagram 600 of an example algorithm that can be employed by the APD analysis component 404 of the network diagnostic platform 204 to diagnose APD discrepancies for one or more antennas of a cell site. At, at 602, RSSI data and/or current APDs are collected for one or more antennas of a cell site. The RSSI and/or current APDs data is then sent to and received by the a network diagnostic platform 204 for processing thereof by the data processing component 210. Process 600 specifically exemplifies processing of the input data by APD analysis component 404. Process 600 will be described with the assumption that the cell site includes two antennas for exemplary purposes. However, it should be appreciated that one or more aspects of process 600 can be employed for a cell site having any number N of antennas.

At 604, if current APD data is not received, the APD analysis component 404 computes the current APDs for each antenna using the RSSI data. AT 606, the APD analysis component 404 computes variation between the current APD parameters (e.g. parameters for antenna attenuations and gains) and reference parameters (e.g. APD parameter provided by an antenna vendor) for each antenna of a cell. At 608, the APD analysis component 404 determines whether the variation is within an acceptable range for one or both antennas. If it is acceptable, at 610, check 1 is considered satisfied. If it is not acceptable, for one or both antennas, at 612 check 1 is considered failed and scores are associated with each antenna that reflect the severity of the variation.

At 614, the APD analysis component 404 computes the difference between each parameter of a first antenna and the corresponding parameters of a second antenna. At 616, the APD analysis component 404 determines whether the variations are within an acceptable range for one or both antennas. If it is acceptable, at 616, check 2 is considered satisfied. If it is not acceptable, for one or both antennas, at 618 check 2 is considered failed and scores are associated with each antenna that reflect the severity of the variations.

At 622, the APD analysis component 404 computes the estimated path gain for the first antenna and the second antenna by adding attenuations and gains. At 624, the APD analysis component 404 computes the difference between the estimated path gains for the first antenna and the second antenna. At 626, the APD analysis component 404 determines whether difference is within an acceptable range for one or both antennas. If it is acceptable, at 628, check 3 is considered satisfied. If it is not acceptable, for one or both antennas, at 630 check 3 is considered failed and scores are associated with each antenna that reflect the severity of the variations.

At 632, the APD analysis component 404 obtains the calculated path gain for the first antenna and the second antenna (e.g. when available when data is calculated and from the cell). At 634, the APD analysis component 404 computes the difference between the estimated path gains for the first antenna and the second antenna. At 636, the APD analysis component 404 determines whether difference is within an acceptable range for one or both antennas. If it is acceptable, at 638, check 4 is considered satisfied. If it is not acceptable, for one or both antennas, at 640 check 4 is considered failed and scores are associated with each antenna that reflect the severity of the variations.

At 642, the APD analysis component 404 computes the difference between the estimated path gains and the calculated path gains for the first antenna and the second antenna. At 644, the APD analysis component 404 determines whether the variation is within an acceptable range for one or both antennas. If it is acceptable, at 646, check 5 is considered satisfied. If it is not acceptable, for one or both antennas, at 648 check 5 is considered failed and scores are associated with each antenna that reflect the severity of the variations.

At 650, the APD analysis component 404 determines and/or infers APD issues based on Checks 1-5. In particular, APD analysis component can determine and/or infer discrepancies between current APDs for antennas of a cell and optimal APDs for antennas of a cell. For example, if one or more of the checks 1-5 are not satisfied, the APD analysis component 404 can classify the cell as having an APD issue and compute a severity score based on the values determined in Checks 1-5.

FIG. 7, presents a flow diagram 700 of an example algorithm that can be employed by the interference analysis component 406 of the network diagnostic platform 204 to diagnose external interference issues for one or more antennas of a cell site. At, at 702, RSSI data is collected for one or more antennas of a cell site during a low traffic period. The RSSI data is then sent to and received by the a network diagnostic platform 204 for processing thereof by the data processing component 210. Process 700 specifically exemplifies processing of the input data by interference analysis component 706. Process 700 will be described with the assumption that the cell site includes two antennas for exemplary purposes. However, it should be appreciated that one or more aspects of process 700 can be employed for a cell site having any number N of antennas.

At 704 the interference analysis component 406 computes the average measured RSSI for each antenna during the low traffic period. At 706, the interference analysis component 406 computes the variation between the average measured RSSI for each antenna during the low traffic period and reference values associated with the respective antennas (e.g. reference values for the antennas provided by a vendor and/or stored in memory 116). At 708, the interference analysis component 406 determines whether variation is within an acceptable range for one or both antennas. If it is acceptable, at 710, check 1 is considered satisfied. If it is not acceptable, for one or both antennas, at 712 check 1 is considered failed and scores are associated with each antenna that reflect the severity of the variations.

At 714, for each antenna, the interference analysis component 406 computes the autocorrelation of the RSSI's for a predetermined number of lags (e.g. every 10 samples) during the low traffic period. At 716, the interference analysis component 406 counts the number of times the autocorrelation coefficients peak above a predetermined threshold for each antenna. At 718, the interference analysis component 406 determines whether the peak count for the autocorrelation data is within an acceptable range for one or both antennas. If it is acceptable, at 720, check 2 is considered satisfied. If it is not acceptable, for one or both antennas, at 722 check 2 is considered failed and scores are associated with each antenna that reflect the severity of the variations.

At 726, the interference analysis component 406 computes the correlation coefficient between the average RSSI values for the first and second antennas. At 726, the interference analysis component 406 determines whether the correlation coefficient is within an acceptable (e.g., predetermined optimal) range. If it is acceptable, at 728, check 3 is considered satisfied. If it is not acceptable, for one or both antennas, at 730 check 3 is considered failed and scores are associated with the cell sites that reflects the severity of the variations.

At 732, the interference analysis component 406 determines and/or infers a level of external interference associated with the cell site (e.g., affecting signals received at the cell site) based on Checks 1-3. For example, if the checks in Checks 1 and 3 are not satisfied for at least one branch, and the Check 3 is not satisfied, the interference analysis component 406 declares external interference and computes a score indicating the severity of the interference based on the scores computed in Checks 1 and 2. At 734, the interference analysis component 406 employs the count data (e.g. the periodicity of the autocorrelation data) to determine a cause or source of the external interference.

Referring now to FIGS. 8A-AB, presented is a flow diagram 800 of an example algorithm that can be employed by the PIM analysis component 408 of the network diagnostic platform 204 to diagnose PIM issues associated with a cell site. With reference initially to FIG. 8A, at 802, RSSI data is collected for one or more antennas of a cell site during both a low traffic period and a high traffic period. The RSSI data is then sent to and received by the a network diagnostic platform 204 for processing thereof by the data processing component 210. Process 800 specifically exemplifies processing of the input data by PIM analysis component 408. Process 800 will be described with the assumption that the cell site includes two antennas for exemplary purposes. However, it should be appreciated that one or more aspects of process 800 can be employed for a cell site having any number N of antennas.

At 804, the average measured RSSI for each antenna is computed during the low traffic period and the high traffic period. At 806, the difference between the average measured RSSI for each antenna and baseline values for the respective antennas during the low traffic period and the high traffic period is measured. Baseline values for an antenna's anticipated performance during the low traffic period and the high traffic period can be stored by the network diagnostic platform 204 and/or sent to the network diagnostic platform as input data. For example, a vendor can provide the baseline RF values to the network diagnostic platform 204. At 808, the PIM analysis component 408 determines whether the difference is within an acceptable range for one or both antennas during the low traffic period and the high traffic period. If it is acceptable, at 810, check 1 is considered satisfied. If it is not acceptable, for one or both antennas, at 812, check 1 is considered failed and scores are associated with each antenna that reflect the severity of the variation.

At 814, the variation between the average measured RSSI for each of the antennas during the low traffic period and the high traffic period is computed. At 816, the PIM analysis component 408 then determines whether the variation is within an acceptable range for one or both antennas during both periods. If it is acceptable, at 818, check 2 is considered satisfied. If it is not acceptable, for one or both antennas, at 820, check 2 is considered failed and scores are associated with each antenna that reflect the severity of the variation.

At 822, the PIM analysis component 408 computes the histogram for the measured RSSI sample values for reach of the antennas during both periods. For example, when RSSI data is collected for a for a period of 10 seconds at a rate of 10 milliseconds, the RSSI input data would include 100 samples. At 824, the PIM analysis component 408 then analyzes and computes relative variations in the RSSI's for each antenna during both periods. At 826, the PIM analysis component 408 then determines whether the variation is within an acceptable range for one or both antennas (e.g. does not vary beyond a predetermined threshold). If it is acceptable, at 828, check 3 is considered satisfied. If it is not acceptable, both antennas, at 830, check 3 is considered failed and scores are associated with each antenna that reflect the severity of the variation. Process 800 continues at 832 with respect to FIG. 8B.

Figure 8B:
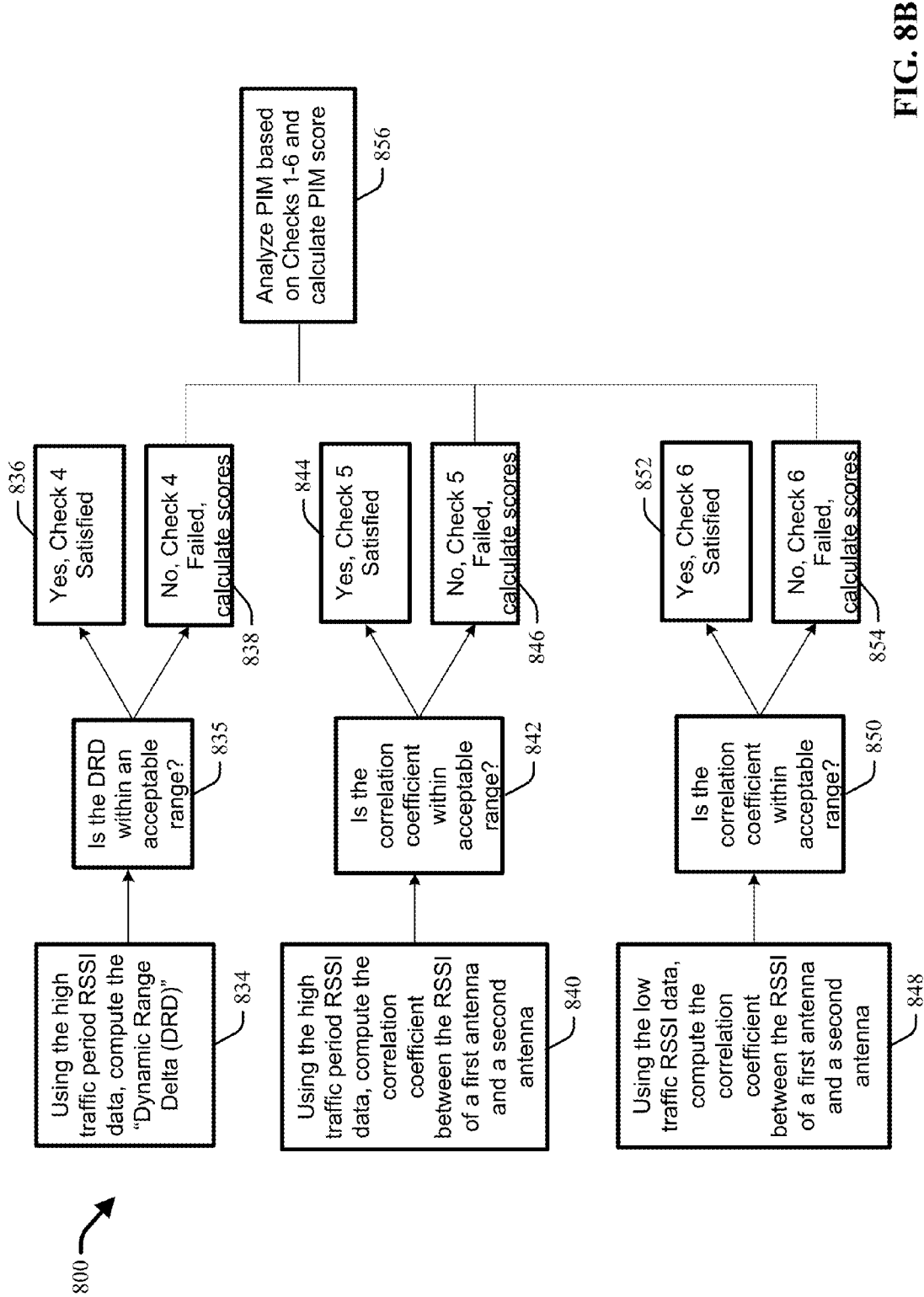

Turning to FIG. 8B, at 834, using the high traffic period RSSI data, the PIM analysis component 408 computes the dynamic range delta (DRD). At 835, the PIM analysis component 408 determines whether the DRD is within acceptable range. If it is acceptable, at 836 check 4 is considered satisfied. If it is not acceptable, at 838, check 4 is considered failed and scores are associated with one or both antennas that reflect the severity of the variation. The PIM analysis component calculates the DRD as follows: 1.) For every few (e.g. 10) consecutive RSSI samples for an antenna, the difference between the maximum and minimum RSSI for those samples is computed and defined as the dynamic range for that antenna. 2.) The differences between the dynamic ranges of both the antennas is computed for every few consecutive RSSI samples. 3.) The DRD is then computed by averaging theses differences.

At 840, using the high traffic period RSSI data, the PIM analysis component 408 computes the correlation coefficient between the RSSI's of both antennas. At 842, the PIM analysis component 408 determines whether the correlation coefficient is within acceptable range. If it is acceptable, at 844 check 5 is considered satisfied. If it is not acceptable, at 846, check 5 is considered failed and scores are associated with one or both antennas that reflect the severity of the variation.

At 848, using the low traffic period RSSI data, the PIM analysis component 408 computes the correlation coefficient between the RSSI's of both antennas. At 850, the PIM analysis component 408 determines whether the correlation coefficient is within acceptable range. If it is acceptable, at 852 check 6 is considered satisfied. If it is not acceptable, at 854, check 6 is considered failed and scores are associated with one or both antennas that reflect the severity of the variation.

At 556, the PIM analysis component diagnoses PIM issues for the cell site based on the results of Checks 1-6. For example, if during the high traffic period, at least one of the antennas does not satisfy Check 3, and Checks 2, 4 and 5 are not satisfied, and during the low traffic period Check 2 and 3 are not satisfied, a PIM issue is declared with a score based on severity of the PIM issue with a score based on Checks 2 and Checks 4. In another example, if during the low traffic period at least one of the antennas fails Check 3 and Checks 2 and 6 are not satisfied, a PIM issue is declared with a score based on Check 2.

FIG. 9 presents another system 900 for determining a state or status of a network element having an impact on uplink noise increase, in accordance with aspects described herein. Repetitive description of like elements employed in respective embodiments of systems and devices described herein are omitted for sake of brevity. System 900 is similar to systems 200 and 400 with the addition of report analysis component monitoring component 902 and report analysis component 910.

Report analysis component 904 is configured to analyze reports generated by report component 208 to make various additional determinations and inferences based on the report. In particular, as discussed supra, report component 208 is configured to generate information (e.g., in the form of a report 218, or in any other suitable format) indicating states of network elements (e.g., hardware, APD, interference, and PIM) associated with one or more cell sites of a cellular network. The report can include a variety of information such as that discussed with respect to FIG. 3. For example, the report can include overall scores reflecting a hardware, APD, interference and/or PIM issue present at a cell site of the network as well as detailed breakdowns of scores associated with various checks/tests employed to determine the overall scores.

The report analysis component 904 can include network optimization component 906 to diagnose general and specific problems/issues associated with one or more cell sites using a report 218 and determine and/or infer remedial measures to corrected the problems and issues. For example, the report component 206 can generate a single report or a compilation of reports having diagnostic information for a plurality of network cell sites (e.g., every cell site in the network or a subset of every cell site in the network). According to this example, the network optimization component 906 can analyze the issues associated with each of the plurality of cells of a cellular network to identify particular cells affected with one or more of hardware, APD, interference and PIM issues. In another example, the network optimization component 906 can focus its attention on a single cell site to diagnose specific, issues and remedial measures to correct those issues, at the cell site. For example, a report can identify a cell as having a hardware issue. According to this example, the network optimization component 906 can further analyze the report to identify the particular hardware problem.

The network optimization component 906 can further determine or infer remedial measures to correct the issues/problems based on the report(s). In an aspect, the remedial measures are determined based on relationships/correlations between cells as determined by the network optimization component 904 using the reports. The network optimization component 906 can further employ inference component 212 to infer remedial measures. For example, reports generated by report component 206 can be stored in memory 216 over time. According to this example, the network optimization component 906 can infer a remedial measure based on analysis of historical data. This approach can be expanded to include near—real time remediation with an analysis performed prior to repair and just after repair completion with the reports being able to allow the confirmation of the repair and possible savings in repair costs.

In some aspects, the network optimization component 906 can further effectuate remedial measures. For example, where the remedial measure does not require physical/manual interaction (e.g., repair of hardware), the network optimization component can communicate with cell sites to issue commands that effectuate remedial measures. According to this example, the network optimization component 906 can automatically adjust an antenna's APD settings.

Key performance indicator (KPI) identification component 908 is configured to analyze a report for a cell site or a plurality of cell sites with the intention of identifying issues/problems with one or more elements of the cell site that are classified as critical. Such issues are referred to as key performance indicators. In order to identify KPI's, the KPI identification component 908 can employ various lookup tables and algorithms store in memory 212 as well as inference component 212. In response to identification of a KPI, the KPI identification component can flag the issue in a report and/or issue an alarm or secondary report indicating identification of the KPI.

Algorithm optimization component 910 is configured to analyze report history to fine tune the various algorithms employed by data processing component 210 for processing of diagnostic input data. In an aspect, the algorithm optimization can automatically adjust the various algorithms to accommodate network changes.

Monitoring component 902 is configured to monitor the general health of the network, a cell site, and/or a specific element associated with a cell site. For example, the monitoring component 902 can monitor the states of KPI associated with a cell site by examining current reports and report history for a cell site. In another example, the monitoring component 902 can monitor the states of previous issues that have been corrected to ensure that they were corrected properly. In particular, the network optimization component 906 can issue remediation of problem or otherwise undesirable characteristic of the cellular network or an element of the cellular network. For example, the network optimization component 906 can issue remediation of a network element determined to be in a malfunctioning state to transition the network element from the malfunctioning state to a proper functioning state. The monitoring component 902 can further monitor the state of the network element after issuing the remediation and/or after receiving indication that the network element has been transitioned to a proper functioning state. In an aspect, the monitoring component can monitor the state of the network element to determine if the network element has been transitioned into the proper functioning state (e.g., if the malfunctioning network element has been fixed). The monitoring component 902 can further monitor the state of the network element for a predetermined period of time after the network element has been fixed (e.g., one week, one month, etc.) to ensure that the network element remains in the proper functioning state. In this respect, the monitoring component can monitor states of network elements in real time or near real time, to ensure that they are in a proper functioning state, to detect issues with the network elements, and identify when the issues have been corrected.

In view of the example systems and/or devices described herein, example methods that can be implemented in accordance with the disclosed subject matter can be further appreciated with reference to flowcharts in FIGS. 10-13. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 10:
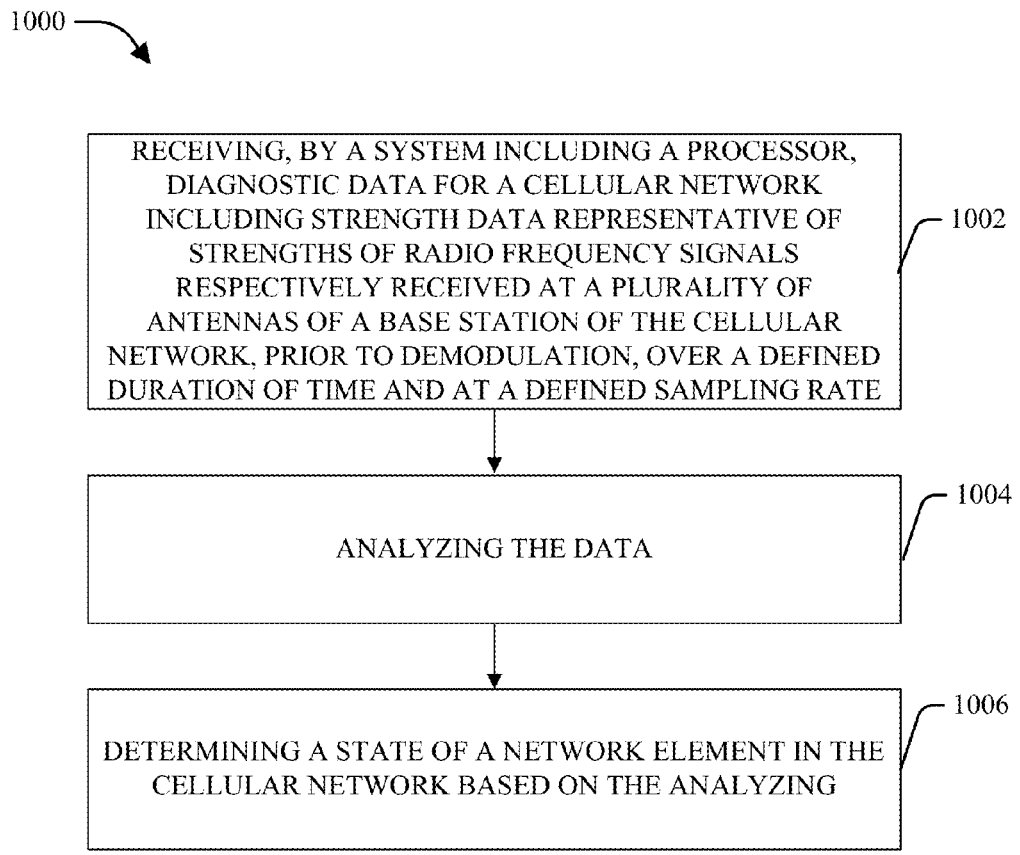
FIG. 10 is a flow diagram of an example method for determining states of cellular network elements having an impact on uplink noise increase, in accordance with various aspects and embodiments described herein.

FIG. 10 illustrates a flow chart of an example method 1000 for diagnosing causes of uplink noise increase in a cellular network in accordance with aspects described herein. At 1002, cellular network diagnostic data is received by a by a system including a processor (e.g., network diagnostic platform 204). The cellular network diagnostic data includes data representative of strengthS of radio frequency signals (RSSI data) respectively received at a plurality of antennas of a base station of the cellular network, prior to demodulation, over a defined duration (e.g., about 1.0 minute) and at a defined sampling rate (e.g., at a sampling rate of about 10 to about 100 samples per second). At 1004, the data is analyzed (e.g., using one or more algorithms stored by the system). At 1006, a state or status of a network element (e.g., an element having a known causal relationship with an increase in uplink noise) in the cellular network is determined based on the analysis. Such network elements can include hardware associated with the base station (including the antennas), APDs of antennas, external interference and PIM.

Figure 11:
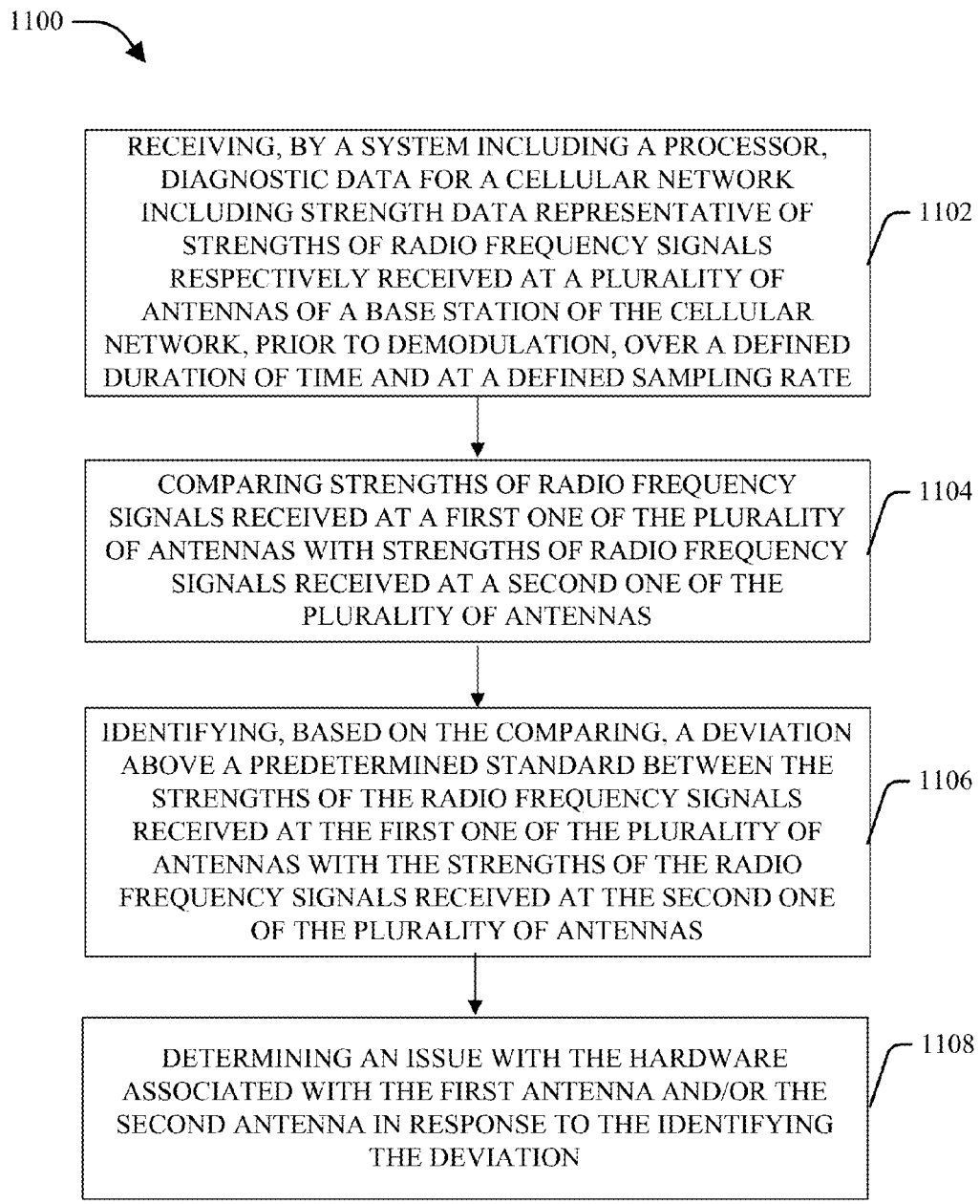
FIG. 11 is a flow diagram of another example method for determining states of cellular network elements having an impact on uplink noise increase, in accordance with various aspects and embodiments described herein.

FIG. 11 illustrates a flow chart of an example method 1100 for diagnosing causes of uplink noise increase in a cellular network in accordance with aspects described herein. At 1102, cellular network diagnostic data is received by a by a system including a processor (e.g., network diagnostic platform 204). The cellular network diagnostic data includes data representative of strengths of radio frequency signals (RSSI data) respectively received at a plurality of antennas of a base station of the cellular network, prior to demodulation, over a defined duration (e.g., about 1.0 minute) and at a defined sampling rate (e.g., at a sampling rate of about 10 to about 100 samples per second). At 1104, strengths of the radio frequency signals received at a first one of the antennas are compared with the strengths of radio frequency signals received at a second one of the plurality of antennas. At 1106, a deviation above a predetermined threshold is determined between the strengths of the radio frequency signals received at the first one of the antennas and the strengths of radio frequency signals received at the second one of the plurality of antennas. At 1108, an issue with hardware associated with the first antenna and/or the second antenna is determined in response to the identified deviation.

Figure 12:
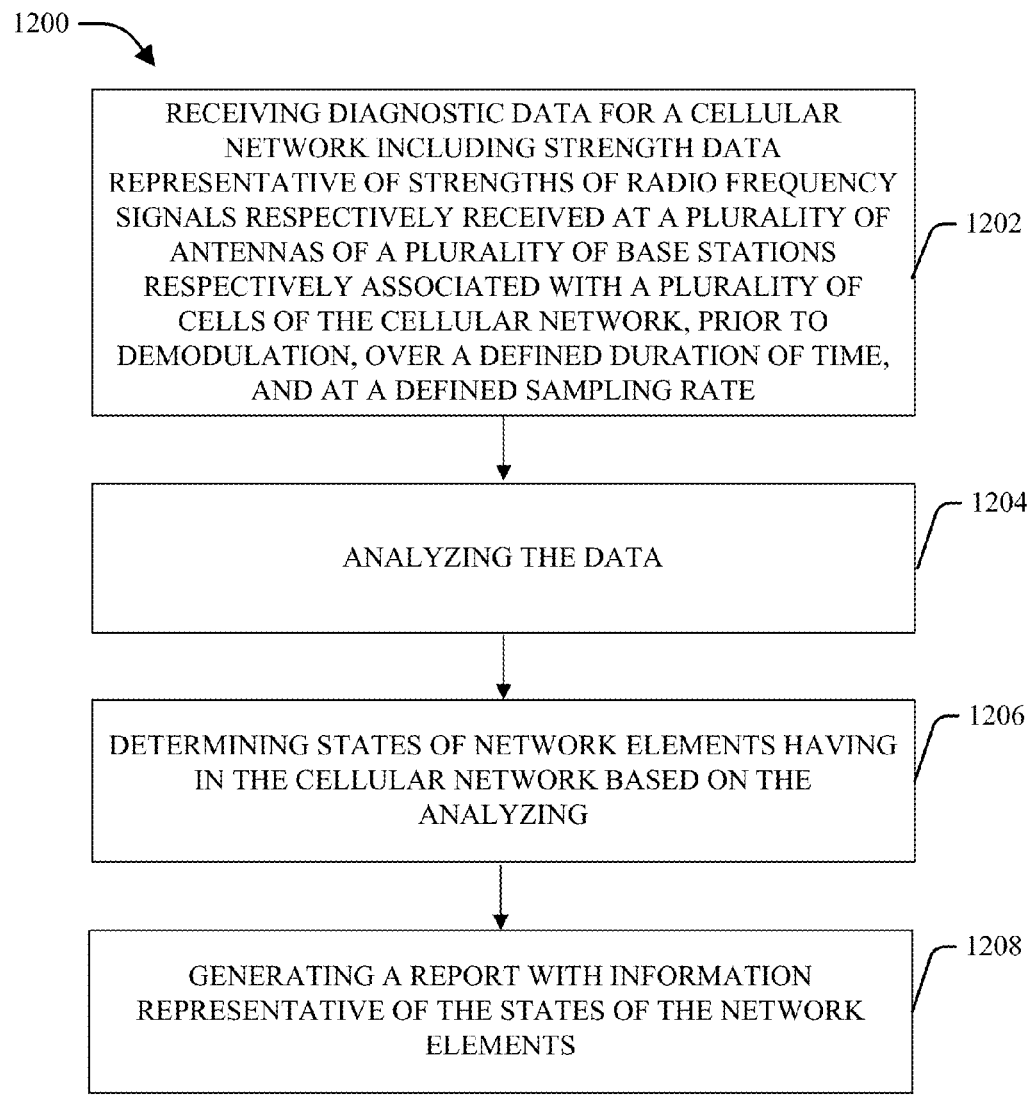
FIG. 12 is a flow diagram of another example method for determining states of cellular network elements having an impact on uplink noise increase, in accordance with various aspects and embodiments described herein.

FIG. 12 illustrates a flow chart of another example method 1200 for diagnosing causes of uplink noise increase in a cellular network in accordance with aspects described herein. At 1202, cellular network diagnostic data is received by a by a system including a processor (e.g., network diagnostic platform 204). The cellular network diagnostic data includes data representative of strengths of radio frequency signals (RSSI data) respectively received at a plurality of antennas of a plurality of base stations of the cellular network, prior to demodulation, over a defined duration (e.g., about 1.0 minute) and at a defined sampling rate (e.g., at a sampling rate of about 10 to about 100 samples per second). At 1204, the data is analyzed (e.g., using one or more algorithms stored by the system). At 1206, states of network elements (e.g., and/or interference characteristics) in the cellular network are determined based on the analysis. Such network elements can include but are not limited to, hardware associated with the base station (including the antennas), APDs of antennas, external interference and PIM. At 1208, a report is generated with information representative of the states of the network elements.

Figure 13:
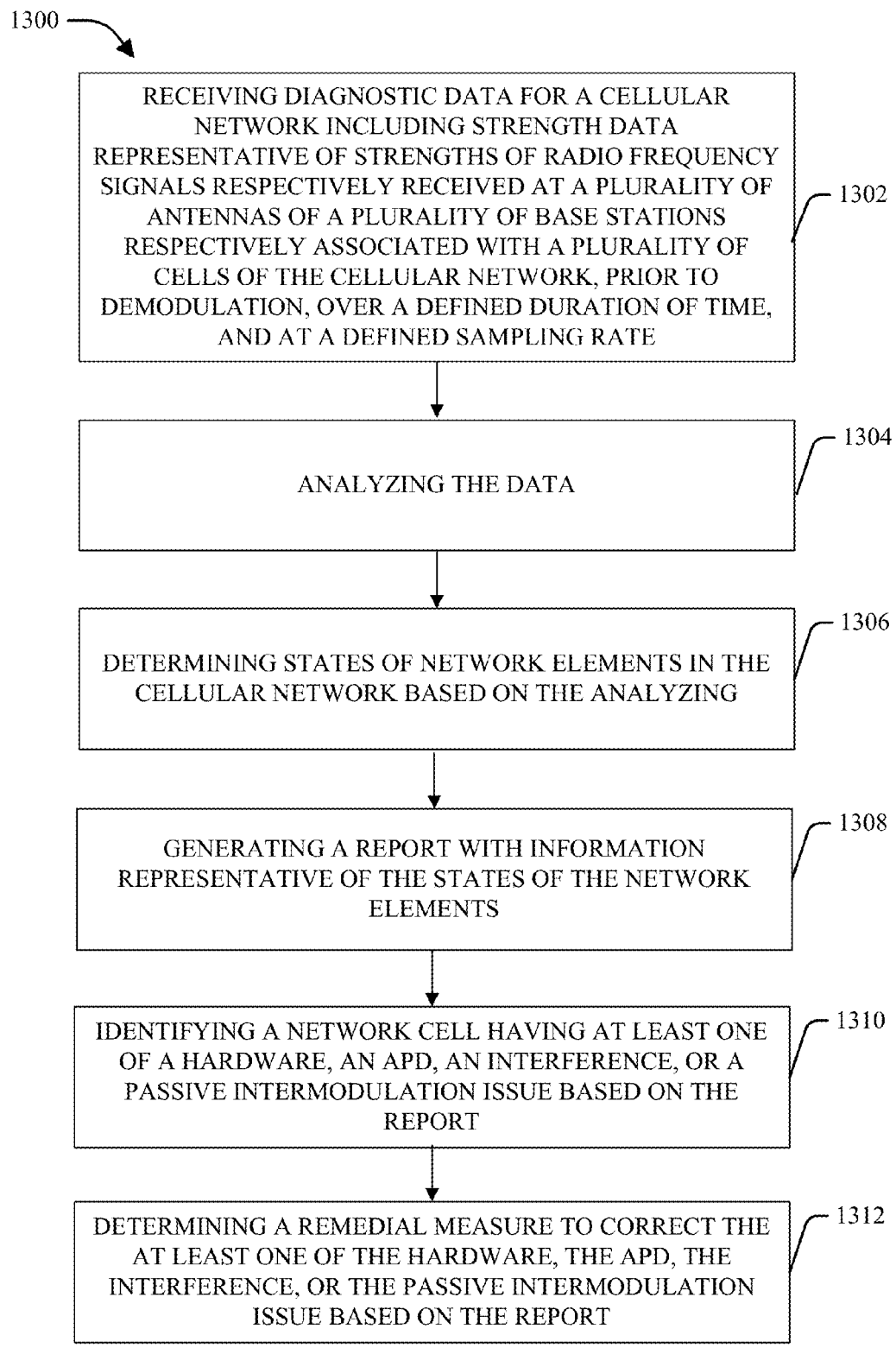
FIG. 13 is a flow diagram of another example method for determining states of cellular network elements having an impact on uplink noise increase, in accordance with various aspects and embodiments described herein.

FIG. 13 illustrates a flow chart of another example method 1300 for diagnosing causes of uplink noise increase in a cellular network in accordance with aspects described herein. At 1302, cellular network diagnostic data is received by a by a system including a processor (e.g., network diagnostic platform 204). The cellular network diagnostic data includes data representative of strengths of radio frequency signals (RSSI data) respectively received at a plurality of antennas of a plurality of base stations of the cellular network, prior to demodulation, over a defined duration (e.g., about 1.0 minute) and at a defined sampling rate (e.g., at a sampling rate of about 10 to about 100 samples per second). At 1304, the data is analyzed (e.g., using one or more algorithms stored by the system). At 1306, states of network elements in the cellular network, and/or /characteristics of the network, are determined based on the analysis. Such network elements/characteristics can include but are not limited to, hardware associated with the base station (including the antennas), APDs of antennas, external interference and PIM. At 1308, a report is generated with information representative of the states of the network elements. At 1310, a network cell is identified that has at least one of a hardware, an APD, an interference, or a PIM issue based on the report. At 1312, a remedial measure to correct the at least one of the hardware, the APD, the interference, or the PIM issue, is determined based on the report.

Figure 14:
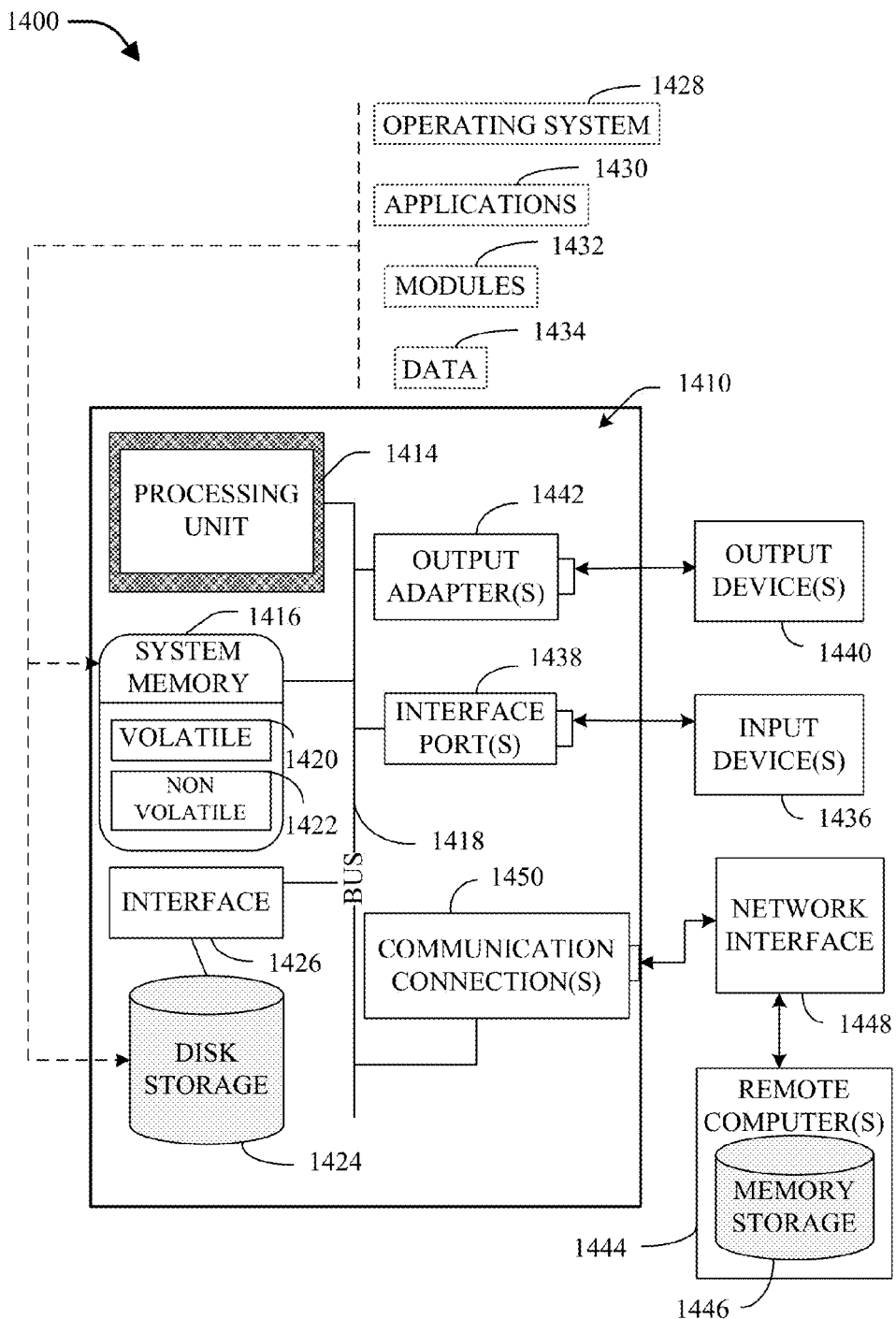
FIG. 14 is a schematic block diagram illustrating a suitable operating environment in accordance with various aspects and embodiments.
Figure 15:
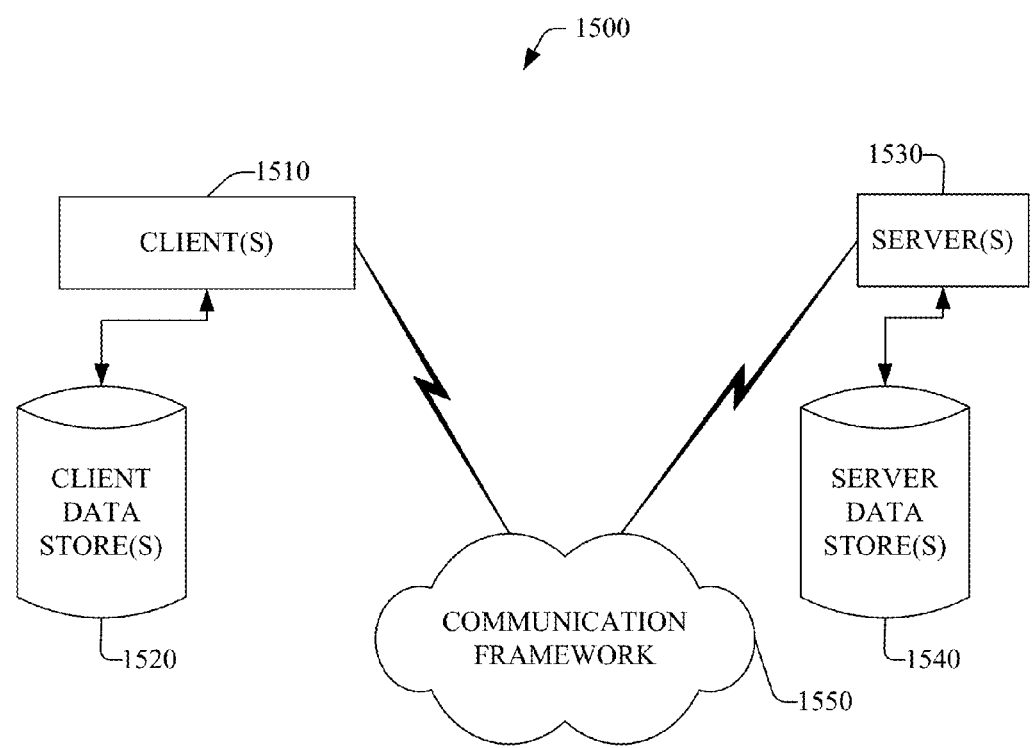
FIG. 15 is a schematic block diagram of a sample-computing environment in accordance with various aspects and embodiments.

Referring now FIGS. 14 and 15. FIGS. 14 and 15, as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone, electronic tablets or pads, etc.), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

With reference to FIG. 14, a suitable environment 1400 for implementing various aspects of this disclosure includes a computer 1412. The computer 1412 includes a processing unit 1414, a system memory 1416, and a system bus 1418. It is to be appreciated that the computer 1412 can be used in connection with implementing one or more of the systems or components shown and described in connection with FIGS. 1-7, or otherwise described herein. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1416 includes volatile memory 1420 and nonvolatile memory 1422. The basic input/output system (BIOS), containing the basic routines to transfer information between elements within the computer 1410, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1420 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1410 also includes removable/non-removable, volatile/non-volatile computer storage media. FIG. 14 illustrates, for example, a disk storage 1424. Disk storage 1424 includes, but is not limited to, devices like a magnetic disk drive, floppy disk drive, tape drive, Jaz drive, Zip drive, LS-100 drive, flash memory card, or memory stick. The disk storage 1424 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used, such as interface 1426.

FIG. 14 also depicts software that acts as an intermediary between users and the basic computer resources described in the suitable operating environment 1400. Such software includes, for example, an operating system 1428. Operating system 1428, which can be stored on disk storage 1424, acts to control and allocate resources of the computer system 1410. System applications 1430 take advantage of the management of resources by operating system 1428 through program modules 1432 and program data 1434 stored, e.g., in system memory 1416 or on disk storage 1424. It is to be appreciated that this disclosure can be implemented with various operating systems or combinations of operating systems.

A user enters commands or information into the computer 1410 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1410, and to output information from computer 1410 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1410 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1410. For purposes of brevity, only a memory storage device 1446 is illustrated with remote computer(s) 1444. Remote computer(s) 1444 is logically connected to computer 1410 through a network interface 1448 and then physically connected via communication connection 1450. Network interface 1448 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1410, it can also be external to computer 1410. The hardware/software necessary for connection to the network interface 1448 includes, for exemplary purposes only, internal and external technologies such as, modems including regular telephone grade modems, cable modems and DSL modems, ISDN adapters, and Ethernet cards.

FIG. 15 is a schematic block diagram of a sample-computing environment 1500 (e.g., computing system) with which the subject matter of this disclosure can interact. The system 1500 includes one or more client(s) 1510. The client(s) 1510 can be hardware and/or software (e.g., threads, processes, computing devices). The system 1500 also includes one or more server(s) 1530. Thus, system 1500 can correspond to a two-tier client server model or a multi-tier model (e.g., client, middle tier server, data server), amongst other models. The server(s) 1530 can also be hardware and/or software (e.g., threads, processes, computing devices). The servers 1530 can house threads to perform transformations by employing this disclosure, for example. One possible communication between a client 1510 and a server 1530 may be in the form of a data packet transmitted between two or more computer processes.

The system 1500 includes a communication framework 1550 that can be employed to facilitate communications between the client(s) 1510 and the server(s) 1530. The client(s) 1510 are operatively connected to one or more client data store(s) 1520 that can be employed to store information local to the client(s) 1510. Similarly, the server(s) 1530 are operatively connected to one or more server data store(s) 1540 that can be employed to store information local to the servers 1530.

It is to be noted that aspects, features, and/or advantages of the disclosed subject matter can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as Internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions, wherein the processor can directly perform operations, and/or the processor can indirectly perform operations, for example, by directing or controlling one or more other components to perform operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "Node B," "Evolved Node B" (eNode B or eNB), "Home Node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, UE, AP, communication network, application, transition management component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        receiving strength data representative of strengths of radio frequency signals received at respective antennas of a base station device of a cellular network prior to demodulation, over a defined duration of time, and at a defined sampling rate;
        identifying a first subset of the strength data representative of first strengths of first radio frequency signals received at a first antenna of the respective antennas during a first period of low traffic of the cellular network having less traffic than a second period of high traffic of the cellular network;
        identifying a second subset of the strength data representative of second strengths of second radio frequency signals received at the first antenna during the second period of high traffic;
        analyzing the strength data, comprising determining a degree of variation between the first subset and the second subset; and
        determining whether hardware of the base station device is functioning properly based on the analyzing.

2. The system of claim 1, wherein the operations further comprise:
    identifying a third subset of the strength data representative of third strengths of third radio frequency signals received at a second antenna of the antennas, wherein the analyzing the strength data further comprises:
        determining a current gain for the second antenna based on the third subset; and
        determining a degree of variation between the current gain and a reference gain for the second antenna, and wherein the determining whether the hardware of the base station device is functioning properly comprises:
    determining that a hardware component of the second antenna has an improper configuration state based on the degree of variation being greater than a threshold degree of variation.

3. The system of claim 1, wherein the operations further comprise:
    identifying a third subset of the strength data representative of third strengths of third radio frequency signals received at a second antenna of the antennas during a third period; and
    identifying a fourth subset of the strength data representative of fourth strengths of fourth radio frequency signals received at the first antenna of the antennas during the third period;
    determining a correlation coefficient between the third subset and the fourth subset; and
    determining a level of external interference associated with the base station device based on a degree to which the correlation coefficient differs from a threshold value.

4. The system of claim 3, wherein the operations further comprise:
    determining a current signal-to-interference ratio associated with the second antenna based on the third subset;
    comparing the signal-to-interference ratio with a reference signal-to-interference ratio for the second antenna; and
    determining whether a proximity of a device transmitting to the base station device contributes to the level of external interference based on a difference between the current signal-to-interference ratio and the reference signal-to-interference ratio.

5. The system of claim 1, wherein the operations further comprise:
    determining first correlation coefficients between first sequential groups of the first radio frequency signals;
    identifying a third subset of the strength data representative of third strengths of third radio frequency signals received at a second antenna of the antennas during the first period of low traffic;
    computing second correlation coefficients between second sequential groups of the third radio frequency signals; and
    determining a source of external interference associated with the base station device based on a number of times the first and second correlation coefficients peak above a threshold.

6. The system of claim 1, wherein the analyzing the strength data comprises:
    comparing the strength data to a thermal noise floor threshold for the respective antennas, and wherein the determining comprises:
        determining that the hardware of the base station device is functioning improperly based on a determination that the strength data is below the thermal noise floor threshold for at least one of the respective antennas.

7. The system of claim 1, wherein the analyzing the strength data comprises:
    computing a range of variation in the first radio frequency signals of the first subset, and
    wherein the determining comprises determining that the hardware of the base station device is functioning improperly based on a determination that the range of variation is outside a defined range.

8. The system of claim 1, wherein the determining whether the hardware of the base station device is functioning properly comprises determining that the hardware of the base station device is functioning improperly based on a determination that that the degree of variation is less than a defined degree.

9. The system of claim 1, wherein the operations further comprise:
    identifying a third subset of the strength data representative of third strengths of third radio frequency signals received at the first antenna during a third period of high interference determined to be higher than an average level of interference caused by network traffic of the cellular network;
identifying a fourth subset of the strength data representative of strengths of fourth radio frequency signals received at a second antenna of the respective antennas during the third period, wherein the analyzing the strength data further comprises:
determining a first variation pattern associated with the third subset;
determining a second variation pattern associated with the fourth subset; and
determining a difference between the first variation pattern and the second variation pattern, and wherein the determining whether the hardware of the base station device is functioning properly further comprises:
determining a degree of passive intermodulation associated with the hardware based on the first variation pattern, the second variation pattern and the difference between the first variation pattern and the second variation pattern.

10. A method, comprising:
receiving, by a system comprising a processor, diagnostic data for a cellular network including strength data representative of strengths of radio frequency signals received at respective antennas of a base station device of a cellular network, prior to demodulation, over a defined duration of time, and at a defined sampling rate;
identifying a first subset of the strength data representative of first strengths of first radio frequency signals received at a first antenna of the respective antennas during a first period of low traffic of the cellular network having less traffic than a second period of high traffic of the cellular network;
analyzing, by the system, the strength data, comprising determining a range of variation in the first strengths of the first radio frequency signals of the first subset; and
determining, by the system, whether hardware of the base station device is in an operative condition based on comparison of the range of variation to a threshold range of variation.

11. The method of claim 10, further comprising:
identifying, by the system, a second subset of the strength data representative of second strengths of second radio frequency signals received at a second antenna of the antennas, wherein the analyzing the strength data further comprises:
determining a current gain for the second antenna based on the second subset; and
determining a degree of variation between the current gain and a reference gain for the second antenna, and wherein the determining whether the hardware of the base station device is in the operative condition further comprises:
determining that a hardware component of the second antenna is in an inoperative condition based on the degree of variation being greater than a threshold degree of variation.

12. The method of claim 10, further comprising:
identifying, by the system, a second subset of the strength data representative of second strengths of second radio frequency signals received at a second antenna of the antennas during a third period; and
identifying, by the system, a third subset of the strength data representative of third strengths of third radio frequency signals received at the first antenna of the antennas during the third period;
determining, by the system, a correlation coefficient between the second subset and the third subset; and
determining, by the system, a level of external interference associated with the base station device based on a degree to which the correlation coefficient deviates from a threshold value.

13. The method of claim 10, wherein the analyzing the strength data comprises:
comparing the strength data to a thermal noise floor threshold for the respective antennas, and wherein the determining whether the hardware of the base station device is in the operative condition comprises:
determining that the hardware of the base station device is not in the operative condition based on a determination that the strength data is below the thermal noise floor threshold for at least one of the antennas.

14. The method of claim 10, further comprising:
identifying, by the system, a second subset of the strength data representative of second strengths of second radio frequency signals received at the first antenna during a third period of high interference determined to be higher than an average level of interference caused by network traffic of the cellular network;
identifying, by the system, a third subset of the strength data representative of strengths of third radio frequency signals received at a second antenna of the respective antennas during the third period, wherein the analyzing the strength data further comprises:
determining a first variation pattern associated with the second subset;
determining a second variation pattern associated with the third subset; and
determining a difference between the first variation pattern and the second variation pattern, and wherein the determining whether the hardware of the base station device is in the operative condition further comprises:
determining a degree of passive intermodulation associated with the hardware based on the first variation pattern, the second variation pattern and the difference between the first variation pattern and the second variation pattern.

15. The system of claim 1, wherein the operations further comprise:
sending a notification in response to a determination that the hardware is functioning improperly, and wherein the notification comprises a report that identifies a component of the hardware that is functioning improperly.

16. The system of claim 15, wherein the operations further comprise:
determining a measure to fix the component of the hardware that is functioning improperly; and
including information identifying the measure in the report.

17. A system, comprising:
a processor; and
a memory that stores executable instructions that, when executed by the processor, facilitate performance of operations, comprising:
receiving diagnostic data for a cellular network comprising strength data representative of strengths of radio frequency signals, prior to demodulation, respectively received at antennas of a base station device of the cellular network over a defined duration of time and at a defined sampling rate;

determining first correlation coefficients between first samples representative of first strengths of the first radio frequency signals received at a first antenna of the antennas;

determining a number of times the first correlation coefficients peak above a threshold;

determining second correlation coefficients between second samples representative of second strengths of second radio frequency signals received at a second antenna of the antennas; and determining a number of times the second correlation coefficients peak above the threshold; and identifying a source of external interference associated with the base station device based on the number of times the first and second correlation coefficients peak above the threshold.

18. The system of claim 17, wherein the operations further comprise:

determining a measure to reduce the external interference based on the source; and issuing a command to the base station device that directs the base station device to implement the measure.

19. The system of claim 1, wherein the analyzing further comprises:

determining a range of variation in the first strengths of the first radio frequency signals of the first subset; and determining that hardware of the base station device is functioning properly based on the range of variation being less than a threshold range of variation.

20. The method of claim 10, further comprising:

identifying, by the system, a second subset of the strength data representative of second strengths of second radio frequency signals received at the first antenna during the second period of high traffic, wherein the analyzing the strength data further comprises determining a degree of variation between the first subset and the second subset, and wherein the determining comprises determining that the hardware of the base station device is functioning improperly based on the degree of deviation being less than a threshold degree of deviation.

* * * * *